(12) United States Patent
Tsai et al.

(10) Patent No.: US 11,892,566 B1
(45) Date of Patent: Feb. 6, 2024

(54) MULTIPLEXED LIGHT DETECTION AND RANGING APPARATUS

(71) Applicant: Optowaves, Inc., San Jose, CA (US)

(72) Inventors: Tsung-Han Tsai, Newton, MA (US); Jie Jensen Hou, El Dorato Hills, CA (US); Hao Wu, Wuhan (CN); Shanxing Su, Wuhan (CN); Jiaqi Zhang, Wuhan (CN)

(73) Assignee: Optowaves, Inc., San Jose, CA (US)

( * ) Notice: Subject to any disclaimer, the term of this patent is extended or adjusted under 35 U.S.C. 154(b) by 0 days.

(21) Appl. No.: 17/950,178

(22) Filed: Sep. 22, 2022

(51) Int. Cl.
| G01S 7/481 | (2006.01) |
| G01B 11/24 | (2006.01) |
| G01S 17/89 | (2020.01) |
| G01S 17/58 | (2006.01) |

(52) U.S. Cl.
CPC ............ *G01S 7/4817* (2013.01); *G01B 11/24* (2013.01); *G01S 7/4816* (2013.01); *G01S 17/58* (2013.01); *G01S 17/89* (2013.01)

(58) Field of Classification Search
None
See application file for complete search history.

(56) References Cited

U.S. PATENT DOCUMENTS

| 3,901,597 A | 8/1975 | White |
| 4,174,524 A | 11/1979 | Moran |
| 5,699,151 A | 12/1997 | Akasu |
| 5,956,355 A | 9/1999 | Swanson et al. |
| 6,822,745 B2 | 11/2004 | De Groot et al. |
| 6,956,653 B1 | 10/2005 | Lam et al. |
| 7,337,079 B2 | 2/2008 | Park et al. |
| 8,179,521 B2 | 5/2012 | Valla et al. |
| 8,558,993 B2 | 10/2013 | Newbury et al. |
| 8,659,748 B2 | 2/2014 | Dakin et al. |
| 8,675,184 B2 | 3/2014 | Schmitt et al. |
| 9,383,447 B2 | 7/2016 | Schmitt et al. |
| 9,677,870 B2 | 6/2017 | Jensen |
| 9,702,975 B2 | 7/2017 | Brinkmeyer et al. |
| 10,234,544 B2 | 3/2019 | Ando et al. |
| 10,295,673 B1 | 5/2019 | Tucker |
| 10,324,170 B1* | 6/2019 | Engberg, Jr. .......... G01S 7/4818 |
| 10,324,171 B2 | 6/2019 | Niclass et al. |
| 10,386,174 B2 | 8/2019 | Berz |
| 10,416,292 B2 | 9/2019 | de Mersseman et al. |
| 10,613,229 B2 | 4/2020 | Applegate et al. |
| 10,663,587 B1* | 5/2020 | Sandborn ................ G01S 7/491 |
| 10,866,319 B2 | 12/2020 | Brinkmeyer |

(Continued)

OTHER PUBLICATIONS

"FMCW-LIDAR with tunable twin-guide laser diode," by A. Dieckmann, Electronics Letters, vol. 30, No. 4, Feb. 17, 1994, 2 pages.

(Continued)

*Primary Examiner* — Luke D Ratcliffe
(74) *Attorney, Agent, or Firm* — Saile Ackerman LLC; Stephen B. Ackerman; Billy Knowles

(57) ABSTRACT

A multiplexed LiDAR system generates an image of an object based on the distance of various point measurements to the object. The multiplexed LiDAR utilizes at least two sets of light source emissions to a scanner to simultaneously form multiple scanning patterns that effectively increase the scanning speed, scanning area, or image pixel density of the LiDAR system.

29 Claims, 15 Drawing Sheets

(56) References Cited

U.S. PATENT DOCUMENTS

| | | | |
|---|---|---|---|
| 11,294,040 | B1 | 4/2022 | Tsai et al. |
| 11,520,023 | B2 | 12/2022 | Tsai et al. |
| 2017/0097302 | A1* | 4/2017 | Kreitinger ............... G01N 21/53 |
| 2020/0200874 | A1 | 6/2020 | Donovan |
| 2023/0013992 | A1* | 1/2023 | Schmidtlin ............ G02B 5/045 |

OTHER PUBLICATIONS

"Generation of RF Intensity-Modulated Laser Pulses by Dual-Frequency Injection Seeding," by Lijun Cheng et al., IEEE Photonics Journal, vol. 10, No. 1, Feb. 2018, 10 pages.

"Sensitivity advantage of swept source and Fourier domain optical coherence tomography," by Michael A. Choma et al., Optics Express 2183, vol. 11, No. 18, Sep. 8, 2003, 7 pages.

"Understanding and Ameliorating Non-Linear Phase and Amplitude Responses in AMCW Lidar," by John P. Godbaz et al., Remote Sensing ISSN 2072-4292, www.mdpi.com/journal/remotesensing, @ 2012 by the authors, 22 pages.

"Biaxial Resonant 7mm-MEMS Mirror for Automotive LIDAR application," bu Ulrich Hofmann et al., 2012 International Conference on Optical MEMS and Nanophotonics, Aug. 2012, pp. 150-151.

"Study on the Frequency-Modulated Continuous-Wave LiDAR Mutual Interference," by Il-Pyeong Hwang et al., 2019 IEEE 19th International Conference on Communication Technology, Oct. 16-19, 2019, pp. 1053-1056.

"Indium Phosphide Photonic Integrated Circuit Transceiver for FMCW LiDAR," by Brandon J. Isaac et al., IEEE Journal of Selected Topics in Quantum Electronics, vol. 25, No. 6, Nov./Dec. 2019, 7 pages.

"Polarization-diversity receiver using remotely delivered local oscillator without optical polarization control," by Honglin Ji et al., vol. 28, No. 15, Jul. 20, 2020, Optics Express 22882, 9 pages.

"Versatile endless optical polarization controller/tracker/demultiplexer," by Benjamin Koch et al., Apr. 2014, Optics Express 22(7):8259-76, DOI: 10.1364/OE.22.008259, 18 pages.

"Novel Interferometric Method for the Measurement of Laser Wavelength/Frequency-Modulation Sensitivity," by M. Norgia et al., IMTC 2006—Instrumentation and Measurement Technology Conference, Sorrento, Italy, Apr. 24-27, 2006, pp. 444-447.

"A High Resolution, Chirped Pulse Lidar for Simultaneous Range and Velocity Measurements," by Mohammad Umar Piracha et al., CLEO:2011—Laser Applications to Photonic Applications, OSA Technical Digest (CD) (Optical Society of America, 2011), paper CMG1, 2 pages.

"Time-frequency analysis of long fiber Bragg gratings with low reflectivity," by Juan Sancho et al., Optics Express vol. 21, Issue 6, pp. 7171-7179, Mar. 25, 2013.

"Application of Time-Frequency Domain Reflectometry for Detection and Localization of a Fault on a Coaxial Cable," by Yong-June Shin et al., IEEE Transactions on Instrumentation and Measurement, vol. 54, No. 6, Dec. 2005, pp. 2493-2500.

"Realization of Multitone Continuous Wave Lidar," by Rasul Torun et al., IEEE Photonics Journal, vol. 11, No. 4, Aug. 2019, 11 pages.

"MEMS Laser Scanners: A Review," by Sven T. S. Holmstrom et al., Journal of Microelectromechanical Systems vol. 23, No. 2, Apr. 2014, pp. 259-275.

"MEMS Mirrors for LiDAR: A Review," by Dingkang Wang et al., Micromachines, MDPI, Apr. 27, 2020;11(5):456. doi: 10.3390/mi11050456, 24 pages.

"Comb-calibrated Frequency-modulated Continuous-wave Lidar," by Yang Xie et al., 2020 IEEE 7th International Workshop on Metrology for AeroSpace (MetroAeroSpace), Jun. 22-24, 2020, pp. 372-376.

"A Phase-Retrieving Coherent Receiver Based on Two-Dimensional Photodetector Array," by Yuki Yoshida et al., Journal of Lightwave Technology, vol. 38, No. 1, Jan. 1, 2020, pp. 90-100.

U.S. Office Action, U.S. Appl. No. 17/708,728, Applicant: Tsai et al., dated Jun. 1, 2022, 13 pages.

U.S. Office Action, U.S. Appl. No. 17/315,678, Applicant: Tsai et al., dated Jul. 15, 2021, 22 pages.

U.S. Notice of Allowance, U.S. Appl. No. 17/315,678, Applicant: Tsai et al., dated Nov. 26, 2021, 7 pages.

U.S. Notice of Allowance, U.S. Appl. No. 17/708,728, Applicant: Tsai et al., dated Sep. 28, 2022, 17 pages.

"Range-Resolved Optical Interferometric Signal Processing," by Thomas Kissinger, Cranfield University, Jun. 2015, Phd Thesis, Center for Engineering Photonics, School of Aerospace, Transport and Manufacturing, 239 pages.

"Multipoint Gas Detection Using Range Resolved Interferometry," by James Bremner, Cranfield University, Jul. 2021, Phd Thesis, Center for Engineering Photonics, School of Aerospace, Transport and Manufacturing, 201 pages.

"Simultaneous Dual-Band Wavelength-Swept Fiber Laser Based on Active Mode Locking," by Hwi Don Lee et al., IEEE Photonics Technology Leters, vol. 26, No. 2, Jan. 15, 2014, 5 pages.

"Stable Multi-Wavelength Thulium-Doped Fiber Laser With Two Cascaded Single-Mode-Four-Mode-Single-Mode Fiber Interferometers," by Ying Guo et al., IEEE Access, Multidiciplinary, Rapid Review, Open Access Journal, vol. 9, Jan. 5, 2021, pp. 1197-1204.

"A Survey on LiDAR Scanning Mechanisms," by Thinal Raj et al., Electronics 2020, 9(5), 741; https://doi.org/10.3390/electronics9050741, Apr. 30, 2020, 25 pages.

"Time-Stretched Femtosecond Lidar Using Microwave Photonic Signal Processing," by Lijie Zhao et al., Journal of Lightwave Technology, vol. 38, No. 22, Nov. 15, 2020, pp. 6265-6271.

"Coherent Detection of Backscattered Polarized Laser With Polarization Diversity Reception,"2016 Fourth International Conference on Ubiquitous Positioning, Indoor Navigation and Location(UPINLBS), Nov. 2-4, 2016, pp. 271-277.

* cited by examiner

MULTIPLEXED LIGHT DETECTION AND RANGING APPARATUS

This disclosure is related to U.S. Pat. No. 11,294,040, issued Apr. 5, 2022, and to U.S. patent application Ser. No. 17/708,728, both hereby incorporated by reference in their entirety and assigned to a common assignee.

TECHNICAL FIELD

This disclosure generally relates to light detection and ranging systems. More particularly, this disclosure relates to light detection and ranging systems that generate multiple laser beams from and single source and provides a hybrid scanner to scan the multiple laser beams to a target or targets and receives back-reflected laser beams to multiplexed interferometry circuits to measure distance and speed. Even more particularly, this disclosure relates to methods for light detection and ranging, including methods for multiplexing interferometry techniques to measure distance and speed.

BACKGROUND

Light detection and ranging (LiDAR) is analogous to radio detection and ranging (RADAR) in that LiDAR uses optical waves to determine objects' range, angle, and velocity. LiDAR utilizes differences in laser light return times and wavelengths that can be used to make digital 3-D representations of the target and has been broadly used in terrestrial, airborne, and mobile applications. A LiDAR instrument consists of one or more laser emitters, optics, a scanner, a photodetector, and a signal processor. One or more laser emitters generate a coherent light beam transferred through a set of optics to a scanner to be transmitted to an object to determine the distance or the object's velocity. The physical features are determined in the case of three-dimensional (3D) scanning. The photodetector receives the coherent light reflected from the object and converts the coherent light to electrical signals that are processed to determine the object's distance. The emitter will generate the coherent light as pulses. The signal processor records the time of the transmitted pulse, and the time of the reception of the reflection of the coherent light is recorded. The distance is the difference between the transmitted time and the received time divided by two and multiplied by the speed of light.

Amplitude modulation continuous wave (AMCW) LiDAR is a phase-based form of LiDAR. Unlike direct pulse detection, the phase-based LiDAR emits a continuous laser signal. It modulates the laser emission amplitude with a high-speed radiofrequency (RF) signal to encode the output optical signal. The phase difference between the emitted and reflected signals is detected for ranging. The phase shift of a sinusoidally-modulated continuous laser waveform can be used to infer the distance to an object.

Frequency modulated continuous wave (FMCW) LiDAR is similar to AMCW LiDAR, but the modulation and demodulation are performed optically rather than electrically. FMCW LiDAR uses a wavelength-tuning light source or a phase-modulating light source and an interferometer to measure the object's distance with good sensitivity. The FMCW laser's frequency is linearly modulated by a carrier signal to measure the laser round-trip flight time accurately. The flight time can be calculated with high precision by detecting the beat frequency signal between the returned laser and the emitted laser. High-precision distance measurement can be achieved.

Time-of-interference (TOI) LiDAR technology is a new ranging method that overcomes limitations of traditional LiDAR techniques, including time-of-flight (ToF) and frequency-modulated continuous-wave (FWCW) with the following features: (1) utilization of an interferometer with balanced detector allowing highly sensitive detection of weak interference signals from long range; (2) time delay of the interference signal can be measured even when the signal frequency is high, and thus provides accurate measurement of the distance from the object, eliminating the need of high-speed data acquisition systems; (3) phase- or wavelength-modulation requirement of the light source is low and thus can simplify the complexity of the driver circuit design for the light source. The operating speed of TOI LiDAR systems is mainly limited by the light source's modulation speed and the optical receiver's efficiency. The high sensitivity detection of the TOI LiDAR system reduces the output power requirement of the light source. Thus, it makes the system architecture design highly flexible and allows it to drive multiple TOI LiDAR systems simultaneously using a single light source.

SUMMARY

An object of this disclosure is to provide a multiplexed light detection and ranging (LiDAR) system that is based on time-of-interference (TOI), time-frequency domain reflectometry, and a small wavelength modulation of the coherent light source. The multiplexed LiDAR system records the time delay of two or more interference signals or time-of-interference (TOI), using one single coherent light source in which the operating current or operating temperature determines the output wavelength.

To accomplish this object, a multiplexed LiDAR system has a coherent light source connected to a modulation/scan controller. The modulation scan controller is configured to generate a pulsed wavelength control signal transferred to the coherent light source. The pulsed wavelength control signal may be a current modulation signal or a laser ambient temperature adjustment signal. The pulsed wavelength control signal modulates the coherent light source to generate a pulsed wavelength-modulated coherent light emission.

The pulsed wavelength-modulated coherent light emission is coupled into at least two interferometers. Each interferometer is configured to partition the pulsed wavelength-modulated coherent light emission into sampling and reference portions. The pulsed wavelength-modulated coherent light emission's sampling portion is arranged to impinge upon an object to be measured. The reference portion of the pulsed wavelength-modulated coherent light emission is arranged to provide a reference basis for determining the distance from the multiplexed LiDAR system to the object. The interferometers are further configured for transferring the pulsed wavelength-modulated coherent light to a hybrid scanner. The hybrid scanner is configured to physically transfer the pulsed wavelength-modulated coherent light's sampling portion from each interferometer to a different location on the object and scan the object's surface with the pulsed wavelength-modulated coherent light from each interferometer at the same time. The hybrid scanner is further configured to receive a portion of the pulsed wavelength-modulated coherent light back-reflected from the different locations on the object. The back-reflected pulsed wavelength-modulated coherent light is transferred from the hybrid scanner to each interferometer and then coupled with the reference portion of the pulsed wavelength-modulated coherent light in each interferometer to form an optical interference light signal.

The hybrid scanner is configured to provide a scanning pattern for the pulsed wavelength-modulated coherent light from each interferometer. The scanning patterns are configured to cover different areas on the object to increase the effective scanning range of the multiplexed LiDAR system. In various embodiments, The scanning patterns are configured to cover the same area on the object to increase the effective scanning pixel density of the multiplexed LiDAR system. The hybrid scanning mirror has at least one planar mirror rotating in a first axis and a faceted mirror structured for reflecting the multiple pulsed wavelength-modulated coherent light's sampling portions from the multiple interferometers to the objects. The faceted mirror is rotated on a second axis to establish the scanning patterns for the multiple pulsed wavelength-modulated coherent light's sampling portions.

The multiplexed LiDAR system has a photodetector array configured to convert the optical interference signal from each interferometer to an electrical interference signal. In various embodiments, the photodetector is configured as a polarization-diversity balanced amplified detector. The photodetector has at least one power monitor to measure the input power level to the photodetector. The power monitor output provides a modulated power level with a time delay associated with the object's distance.

The multiplexed LiDAR system has a signal processor configured to receive the electrical interference signal and convert the electrical interference signal to digital data representing the electrical interference signal amplitude as the digital data. The signal processor is configured to generate an imaging range based on the distance from the object to be displayed. The imaging range to be displayed is calculated by a computer system programmed to calculate the time delay determined by the optical interference signal from all interferometers.

The modulation/scan controller is configured to generate a wavelength modulation control signal with a low duty cycle to modulate the coherent light source by controlling the narrow coherent light source's driving current, the temperature of the narrow bandwidth light source, or adjusting the phase of the light emitted from the light source. In other embodiments, the modulation/scan controller will generate a pulsed phase control signal for generating interference when there is a time delay between light in the sample and the reference arms of the interferometer.

In various embodiments, the interferometer includes a polarization controller used to adjust the polarization states of the coherent light emission from the light source and maximize the amplitude of the optical interference signal or electrical interference signal. The interferometer has a first coupler that receives the pulsed wavelength-modulated coherent light from the polarization controller. The coupler divides the pulsed wavelength-modulated coherent light. A first portion of the pulsed wavelength-modulated coherent light is fed into at least one sample arm. A second portion of the pulsed wavelength-modulated coherent light is fed to a reference arm. The interferometer has a circulator connected to receive the first portion of the pulsed wavelength-modulated coherent light from the at least one sample arm. The circulator is configured such that the pulsed wavelength-modulated coherent light from the sample arm enters the circulator and exits from the next port. Generally, the next port is a clockwise direction to direct the pulsed wavelength-modulated coherent light to the scanner. The scanner is configured to physically transfer the sample pulsed wavelength-modulated coherent light to scan the objects. The sampled pulsed wavelength-modulated coherent light is back-reflected from the object for making ranging measurements to the scanner and transferred to the circulator within the interferometer. The back-reflected pulsed wavelength-modulated coherent light is then transmitted from the circulator to a second coupler.

The interferometer's reference arm has a length greater than the sampling arm's length by more than two times the system's maximum ranging depth. The second portion of the pulsed wavelength-modulated coherent light in the reference arm is applied to the second coupler. The second portion of the pulsed wavelength-modulated coherent light transported in the reference arm is coupled with the collected back-reflected pulsed wavelength-modulated light to form an optical interference light signal. The optical interference light signal exits the second coupler to enter a photodetector array.

The maximum frequency of the optical interference signal corresponds to the minimum ranging depth of the multiplexed LiDAR system. It is greater than a Nyquist sampling frequency of the digitizer in the data acquisition and signal processor. The minimum frequency of the optical interference signal corresponds to the maximum ranging depth of the multiplexed LiDAR system. The time delay of the detected optical interference is measured at the falling edge of the optical interference signal's envelope.

In various embodiments, each interferometer's sampled pulsed wavelength-modulated coherent light beam is transferred to one individual scanner aiming at different directions so the multiplexed LiDAR system can be configured to measure distance and display imaging ranges from multiple objects simultaneously.

In various embodiments, the multiplexed LiDAR system can utilize two or more time-of-flight (ToF) or FMCW ranging methods with a single hybridscanner configured to provide a scanning pattern for each ToF or FMCW subsystem. The scanning patterns are configured to cover different areas on the object to increase the effective scanning range of the multiplexed LiDAR system or cover the same area on the object to increase the effective scanning pixel density of the multiplexed LiDAR system.

DETAILED DESCRIPTION

A Multiplexed LiDAR System is configured to generate an image of an object based on the distance of various point measurements to the object. The Multiplexed LiDAR System utilizes a light emitted from a pulsed wavelength-modulated light source divided into at least two sets of light emissions to a scanner to simultaneously form multiple scanning patterns that effectively increase the scanning speed, scanning area, or image pixel density of the LiDAR system.

Figure 1A:
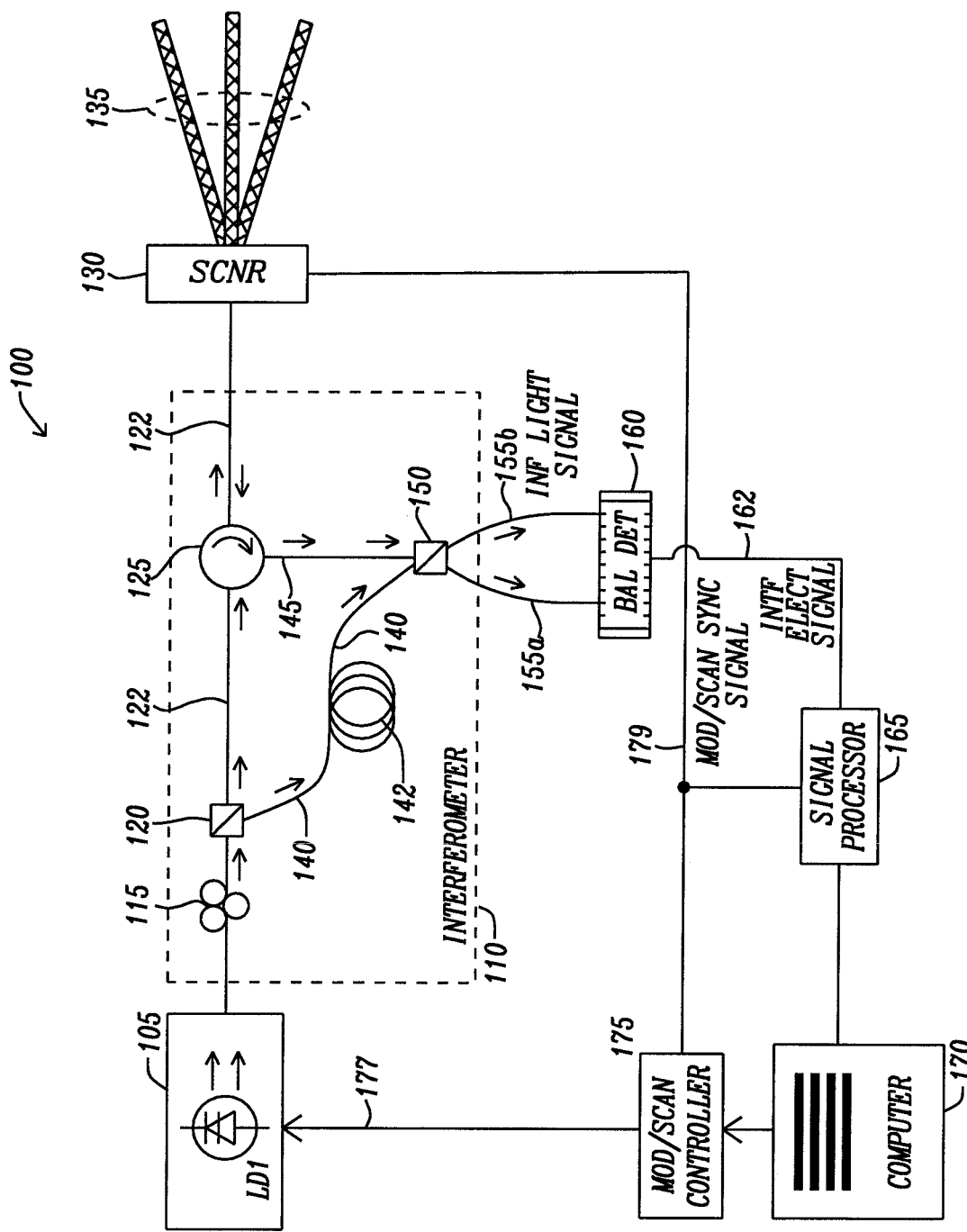
FIG. 1A is a schematic drawing of a TOI LiDAR System of the related art.

FIG. 1A is a schematic drawing of a TOI System 100 of the related art. In FIG. 1A, a TOI LiDAR system 100 includes a pulsed wavelength-modulated narrow bandwidth light source 105. The pulsed wavelength-modulated light source 105 emits a pulse modulated coherent light having an output spectrum composed of single or multiple longitudinal modes. A longitudinal mode of a resonant cavity is a particular standing wave pattern formed by waves confined in the cavity. In a laser, the light is amplified in a cavity resonator, usually composed of two or more mirrors. The cavity has mirrored walls that reflect the light to allow standing wave modes to exist in the cavity with little loss. The longitudinal modes correspond to the reflecting waves' wavelengths reinforced by constructive interference after many reflections from the cavity's reflecting surfaces. All other wavelengths are suppressed by destructive interference. A longitudinal mode pattern has its nodes located axially along the length of the cavity. The laser of the pulsed wavelength-modulated light source 105 is implemented as one of four types of lasers known in the art and categorized as a solid-state laser, a gas laser, a liquid laser, or a semiconductor laser. In the discussion structure of this disclosure, the pulsed wavelength-modulated light source 105 is shown as a semiconductor laser with a wavelength or frequency controlled by either current or temperature. The modulation of the pulsed wavelength-modulated light source 105 is discussed hereinafter.

The pulsed wavelength-modulated narrow band light source 105 emits the pulsed wavelength-modulated coherent light to an interferometer 110. The pulsed wavelength-modulated narrow bandwidth light source 105 emissions are through free space, an optical fiber, or an optical waveguide to the interferometer 110

The interferometer 110, in various embodiments, is implemented as fiber optics, bulk optics, integrated photonic circuitry, or some combinations thereof. The interferometer 110 has a polarization controller 115 that receives the pulsed wavelength-modulated coherent light and adjusts the polarization states of the pulsed wavelength-modulated coherent light from the light source 105. It maximizes the amplitude of the optical interference signals transferred in the optical paths 155a and 155b or interference electrical signal 162. The pulsed wavelength-modulated coherent light from the light source 105 or the pulsed wavelength-modulated coherent light transferred through the polarization controller 115 is applied to a coupler 120. The coupler 120 divides the coherent light into a sample portion fed into at least one sample arm 122 and a reference portion of the pulsed wavelength-modulated coherent light fed into a reference arm 140 within the interferometer 110. The sample arm 122 and the reference arm 140 are implemented as a free-space path, an optical fiber, or an optical waveguide.

The interferometer has a circulator 125 that receives the sample portion of the pulsed wavelength-modulated coherent light from the sample arm 122. The circulator 125 is configured such that the sample portion of the pulsed wavelength-modulated coherent light enters the circulator 125 and exits from the next port to a section of the sample arm 122. The next port is generally, but not required, in a clockwise direction to direct the coherent light through the sample arm 122 to a scanner 130. The scanner 130 is configured to physically transfer the sample pulsed wavelength-modulated coherent light 135 to scan the object. The sampled pulsed wavelength-modulated coherent light 135 is back-reflected from the object for making the ranging measurements. The back-reflected pulsed wavelength-modulated coherent light is received by the scanner 130 and transferred to the circulator 125. The back-reflected pulsed wavelength-modulated coherent light through the optical path 145 is then transferred to a second coupler 150. The optical path is implemented as a free-space path, an optical fiber, or an optical waveguide.

The reference arm 140, as implemented as a free-space path, an optical fiber, or an optical waveguide, has an additional optical path 142 that provides an additional path length such that the reference arm's 140 path length matches the maximum ranging depth of the TOI system 100. The optical pulsed wavelength-modulated coherent light signals from the at least one sample arm 122 and the reference arm 140 are combined in the coupler 150 to generate an optical interference signal.

The pulsed wavelength-modulated coherent light signals from the at least one sample arm 122 and the reference arm 140 are heterodyne detected to extract the beating frequency from the base signal. The beating signal has a 180° phase difference between the coupler outputs. The balanced detector 160 subtracts the signal from each input channel to extract the interference signal that is the beating signal.

The optical interference signal is applied to the optical paths 155a and 155b implemented as a free-space path, an optical fiber, or an optical waveguide. The optical interference signal is applied to the optical paths 155a and 155b and is transferred to a balanced photodetector 160 to convert the optical interference signal from the optical paths 155a and 155b into an interference electrical signal 162.

The interference electrical signal 162 is generated by the balanced photodetector 160 and transferred to a data acquisition circuit within a signal processor 165. The data acquisition circuit within the signal processor 165 converts the interference electrical signal 162 to digital data. The maximum frequency of the optical interference signal corresponds to the minimum ranging depth of the TOI LiDAR system 100. The optical interference signal's maximum frequency is greater than a Nyquist sampling frequency of the digitizer in the data acquisition or the signal processor 165.

The minimum frequency of the optical interference signal as applied to optical paths 155a and 155b corresponds to the maximum ranging depth of the TOILiDAR system 100. The time delay of the detected optical interference is measured at the falling edge of the optical interference signal's envelope.

The digital data is then transmitted to a computer 170 for further processing and display. The signal processor 165 in some embodiments may be integrated with the computer 170 as a single unit.

In various embodiments, the computer 170 is connected to a modulation/scanning controller 175. In other embodiments, the computer 170 is integrated with the modulation/scanning controller 175. The modulation/scanning controller 175 has a modulation subcircuit that determines the modulation, frequency, and shape of the modulation control signal 177 applied to the coherent light source 105. The modulation/scanning controller 175 further has a scanning control circuit that provides a modulation/scan synchronization signal 179 to the signal processor 165 and the scanner 130. The scanning control circuit creates a desired scan pattern that is used to generate an appropriate modulation/scan synchronization signal 179 that is applied to the scanner 130

The scanner 130 may be implemented as a 1-dimensional or 2-dimensional scanner to distribute the sample pulsed wavelength-modulated coherent light 135 to form an image based on the TOI measurement. The 1-dimensional scanning pattern may be linear or non-linear in time and maybe unidirectional or bidirectional. In some implementations of the TOI Lidar system 100, the 2-dimensional scanning pattern may be linear or non-linear in time. It may be in the form of a raster scan, spiral scan, or other patterns to collect the measurement information. The scanner 130 may be realized mechanically as galvanometer mirrors, micro-electro-mechanical systems (MEMS), piezo actuators, or optically including an acousto-optic (AO) deflector or a solid-state scanner. There may be other methods in keeping with the principles of the present disclosure of providing the required scanning motion to collect the measurement information.

Figure 1B:
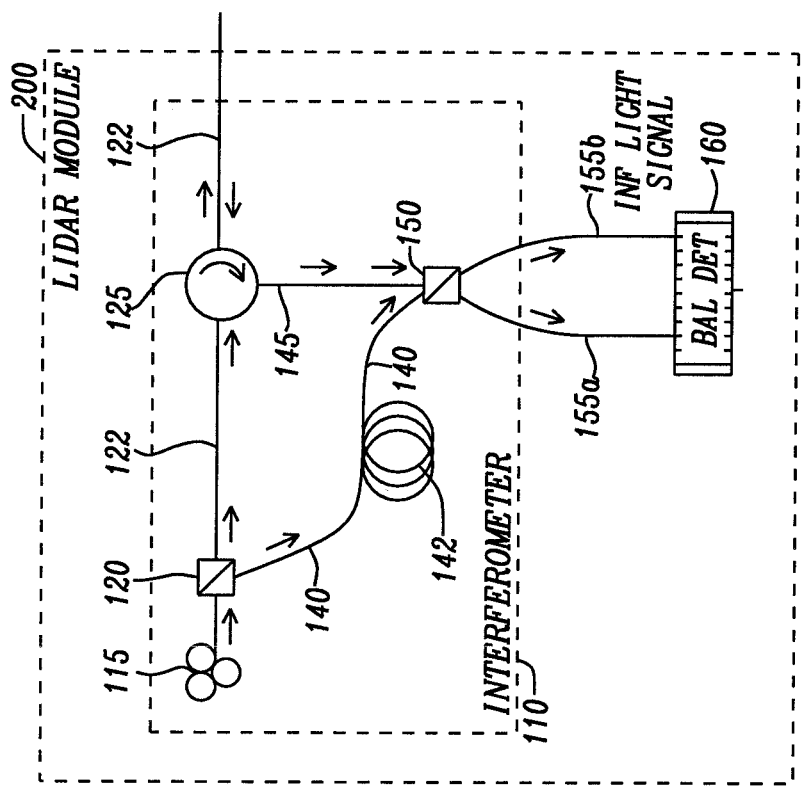
FIG. 1B is a schematic drawing of a LiDAR module embodying the principles of the present disclosure.

FIG. 1B is a schematic drawing of the LiDAR Module 200 embodying the principles of the present disclosure. LiDAR Module 200 has the interferometer 110 and the balanced detector 160. The interferometer 110 and the balanced detector 160 are identical in structure and operation to the interferometer 110 and the balanced detector 160 of the related art, shown in FIG. 1A.

Figure 2:
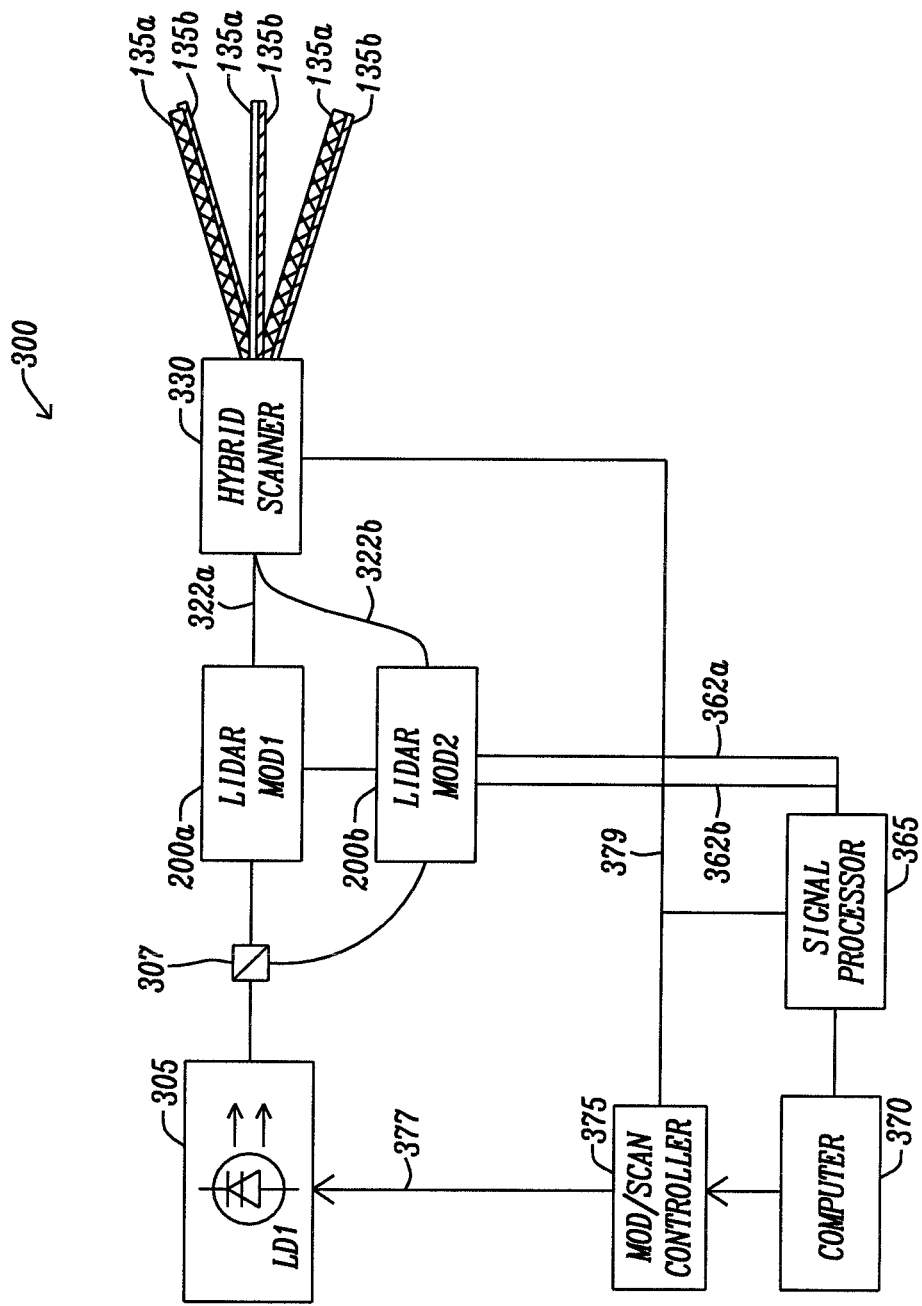
FIG. 2 is a schematic drawing of a Multiplexed LiDAR System embodying the principles of the present disclosure.

FIG. 2 is a schematic drawing of a Multiplexed LiDAR System 300 based on a TOI LiDAR system embodying the principles of the present disclosure. A Multiplexed LiDAR system 300 has a pulsed wavelength-modulated narrow bandwidth light source 305. The pulsed wavelength-modulated light source 305 emits a pulse modulated coherent light having an output spectrum composed of single or multiple longitudinal modes. A longitudinal mode of a resonant cavity is a particular standing wave pattern formed by waves confined in the cavity. In a laser, the light is amplified in a cavity resonator, usually composed of two or more mirrors. The cavity has mirrored walls that reflect the light to allow standing wave modes to exist in the cavity with little loss. The longitudinal modes correspond to the reflecting waves' wavelengths reinforced by constructive interference after many reflections from the cavity's reflecting surfaces. All other wavelengths are suppressed by destructive interference. A longitudinal mode pattern has its nodes located axially along the length of the cavity. The pulsed wavelength-modulated light source 305 is implemented as one of four types of lasers known in the art and categorized as a solid-state laser, a gas laser, a liquid laser, or a semiconductor laser. In the discussion of the structure of this disclosure, the pulsed wavelength-modulated light source 305 is shown as a coherent light source 305 with its wavelength or frequency controlled by either current or temperature. The modulation of the pulsed wavelength-modulated light source 305 is described hereinafter.

The pulsed wavelength-modulated narrow band light source 305 emits the pulsed wavelength-modulated coherent light and is split by an optical splitter 307 to two LiDAR modules 200c and 200d. The pulsed wavelength-modulated narrow bandwidth light source 305 emissions travel through free space, an optical fiber, or an optical waveguide to the optical splitter 307. A first leg from the optical splitter 307 is connected to the first LiDAR Module 200a, and a second leg of the optical splitter 107 is connected to the second LiDAR Module 200b. In various embodiments, an optical switch can be used in place of the optical splitter 307 for applications that requires high detection sensitivity and slower detection speed is acceptable.

The LiDAR modules 200c and 200d in various embodiments are structured as described above in FIG. 1B and are implemented as fiber optics, bulk optics, integrated photonic circuitry, or some combinations thereof. The optical pulsed wavelength-modulated coherent light signals are transferred from the LiDAR modules 200a and 200b to the hybrid scanner 330. The hybrid scanner 300 is implemented as a 1-dimensional or 2-dimensional scanner to distribute the sample pulsed wavelength-modulated coherent light beams 135a and 135b to form an image based on the TOI measurement. The 1-dimensional scanning pattern may be linear or non-linear in time and maybe unidirectional or bidirectional. The sample pulsed wavelength-modulated coherent light beams 135a and 135b are then back-reflected to the hybrid scanner 330 and transferred to the LiDAR modules 200a and 200b. The back-reflected sample pulsed wavelength-modulated coherent light 135a and 135b to the circulator 125 of FIG. 1B and from the circulator 125 to the optical path 145 of the LiDAR modules 200a and 200b to the optical coupler 150. The reference signal from the reference path 140 is combined with the back-reflected optical signals from the circulator 145 in both of the LiDAR modules 200a and 200b in the optical coupler 150 to generate the optical interference signal 155a and 155b of FIG. 1B. Further as shown in FIG. 1B, the back-reflected pulsed wavelength-modulated coherent light signals from the sample arms 122a and 122b and the reference arm 140 are heterodyne detected to extract the beating frequency from the base signal. The beating signal has a 180° phase difference in the two outputs 155a and 155b from the coupler 150. The balanced detector 160 subtracts the signal from each input channel to extract the interference signal that is the beating signal.

The optical interference signal is applied to the optical paths 155a and 155b implemented as a free-space path, an optical fiber, or an optical waveguide. The optical interference signal is applied to the optical paths 155a and 155b and is transferred to a balanced photodetector 160 to convert the optical interference signals from the optical paths 155a and 155b of the two interferometers 110 within the two LiDAR modules 200a and 200b into a first and a second interference electrical signals 362a and 362b of FIG. 2.

The first interference electrical signal 362a and the second interference electrical signal 362b are transferred to a data acquisition circuit within a signal processor 365, where the first and second interference electrical signals 362a and 362b are converted into digital data. In some embodiments, the time delay of the detected electrical interference signal 362a and 362b can be measured at the rising or falling edge of the electrical interference signal's envelope within a signal processor 365 with analog signal processing circuitry and without being converted into digital data.

The digital data is then transmitted to a computer 370 for further processing and display. The signal processor 365, in some embodiments, may be integrated with the computer 370 as a single unit.

In various embodiments, the computer 370 is connected to a modulation/scanning controller 375. In other embodiments, the computer 370 is integrated with the modulation/scanning controller 375. The modulation/scanning controller 375 has a modulation subcircuit that determines the modulation, frequency, and shape of the modulation control signal 377 applied to the coherent light source 305. The modulation/scanning controller 375 further has a scanning control circuit that provides a modulation/scan synchronization signal 379 to the signal processor 365 and the scanner 330. The modulation/scanning controller 375 creates a desired scan pattern that is used to generate appropriate modulation/scan synchronization signal 379 that is applied to the scanner 330.

The scanner 330 may be implemented as a 1-dimensional or 2-dimensional scanner to distribute the sample pulsed wavelength-modulated coherent light beams 335a and 335b to form an image based on the TOI measurement. The 1-dimensional scanning pattern may be linear or non-linear in time and maybe unidirectional or bidirectional. In some implementations of the TOI LiDAR system 300, the 2-dimensional scanning pattern may be linear or non-linear in time. It may be in the form of a raster scan, spiral scan, or other patterns to collect the measurement information. The scanner 330 may be realized mechanically as galvanometer mirrors, polygon mirrors, micro-electro-mechanical systems (MEMS), piezo actuators, optically including an acousto-optic (AO) deflector, or a solid-state scanner. There may be other methods in keeping with the principles of the present disclosure of providing the required scanning motion to collect the measurement information.

Figure 3A:
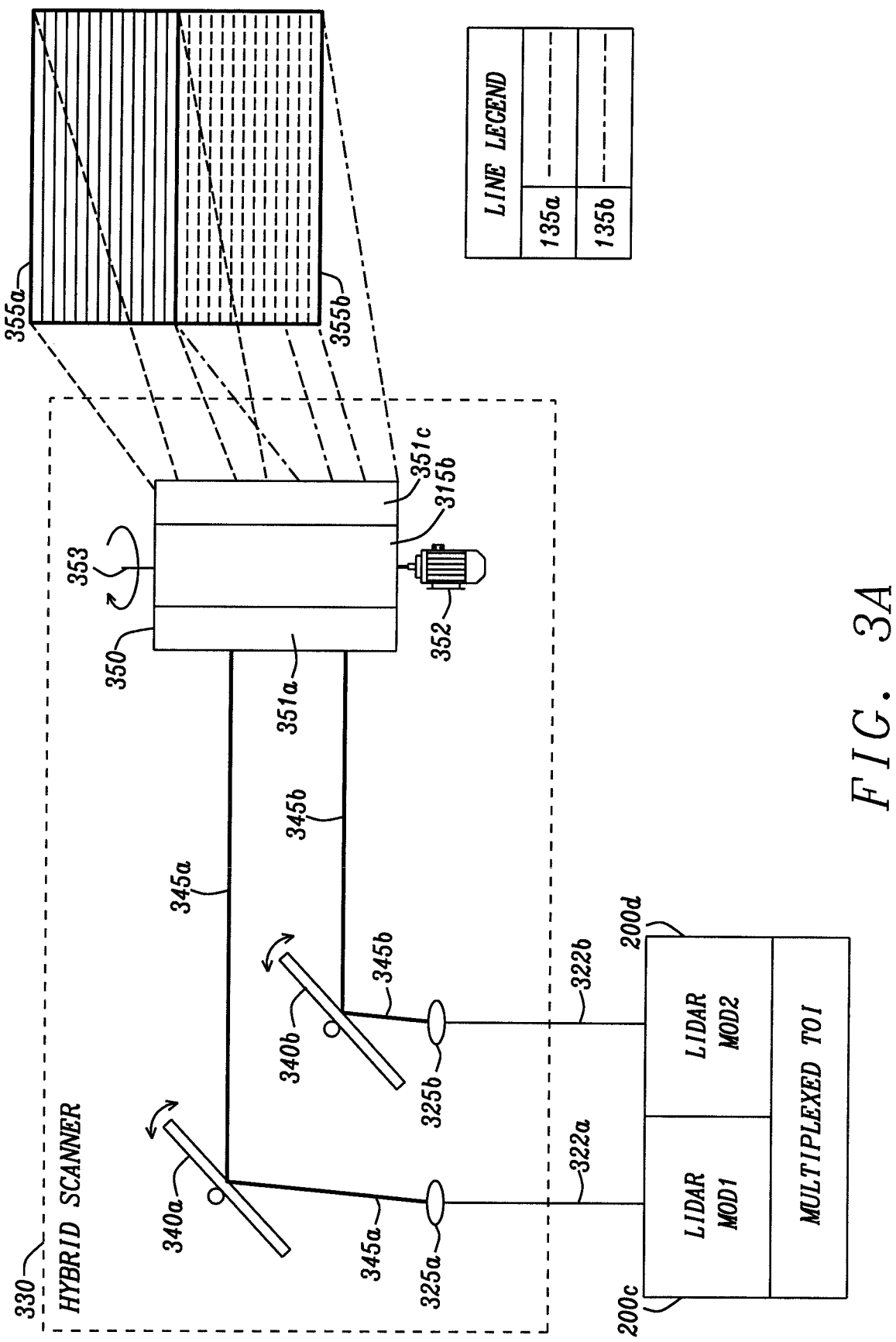
FIG. 3A is a schematic drawing of a scanner configured to scan two illumination light beams from two LiDAR modules of FIG. 1B embodying the principles of the present disclosure, to form a larger scan pattern.
Figure 3B:
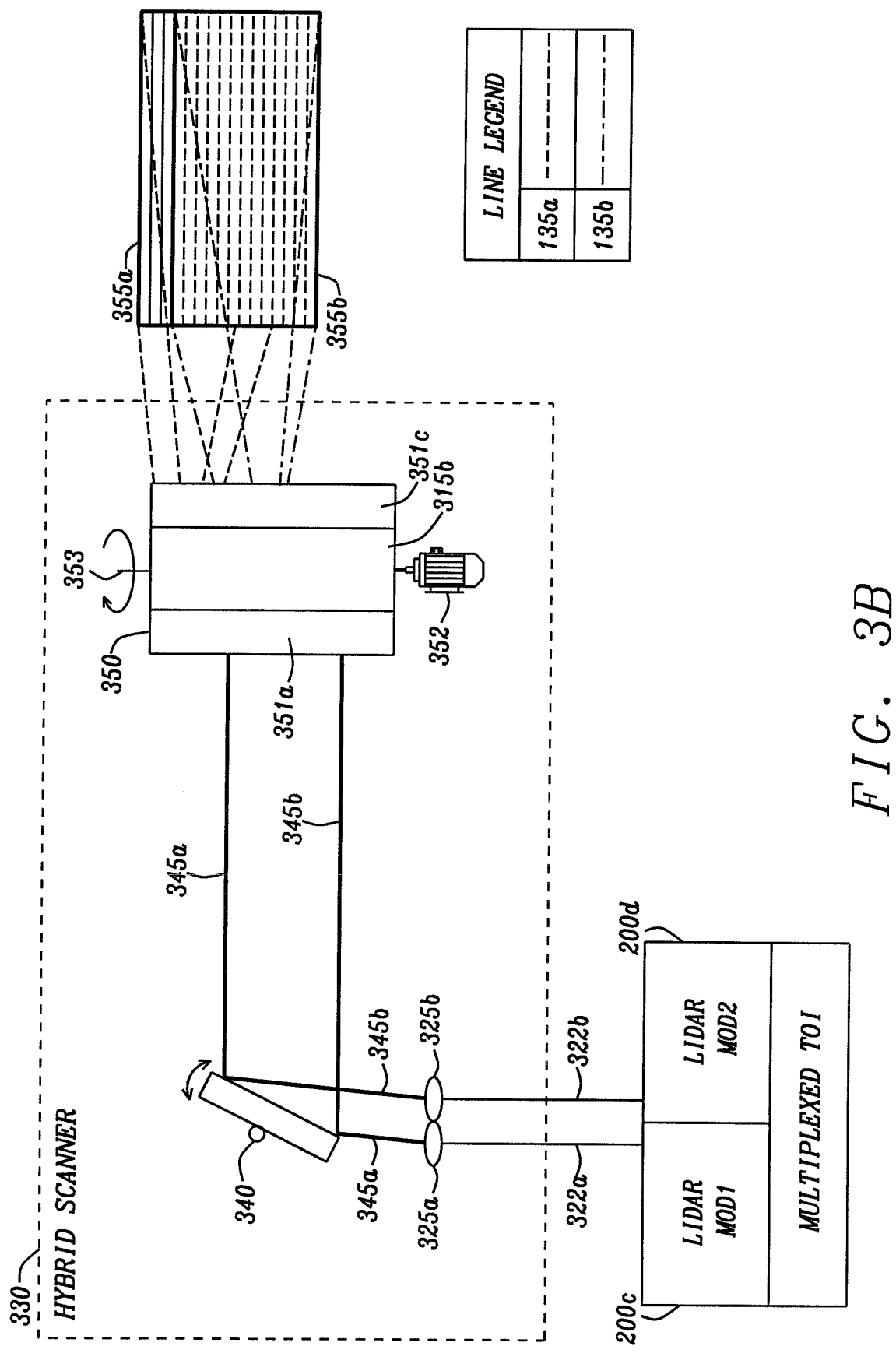
FIG. 3B is a schematic drawing of a scanner configured to scan two illumination light beams from two LiDAR modules of FIG. 1B embodying the principles of the present disclosure, to form a denser scan pattern.

FIGS. 3A and 3B are schematic drawings of the scanner 330 configured for receiving the sampling arms 322a and 322b of the LiDAR modules 200c and 200d, as illustrated in FIG. 1B. the sampling arm 322a from the first LiDAR Module 200c and the sampling arm 200d of the second LiDAR 200d are inserted and secured in scanner 330. The distal end of the first sampling arms 322a and 322b are connected to collimators 325a and 325b to collimate the sample pulsed wavelength-modulated coherent light beams 322a and 322b. To enhance overall efficiency for LiDAR operation, the collimators 325a and 325b require a low numerical aperture for long-distance illumination but a higher numerical aperture for receiving back-reflected pulsed wavelength-modulated coherent light from the object. Thus, the collimators 325a and 325b may be a single fiberoptic lens with an engineered tip, so the on-axis sample pulsed wavelength-modulated coherent light beams 335a and 335b coming out through the center portion of the engineered tip are collimated, while the off-axis back-reflected pulsed wavelength-modulated coherent light from the object going through the annular portion of the engineered tip can be coupled back into the sample arm fiber 322a and 322b. The fiberoptic lens of the collimator can be realized as a gradient-index (GRIN) fiberoptic lens with single-mode fiber, a GRIN fiberoptic lens with few-mode fiber, a fiberoptic ball lens, a GRIN lens assembly, a free-space collimator, or a combination of above. The engineered tip can be a tapered tip, a Fresnel surface, a meta-surface, or a combination thereof.

In FIG. 3A, the pulsed wavelength-modulated coherent light beams 335a and 335b are directed to slow-axis scanning mirrors 340a and 340b. The slow-axis scanning mirrors 340a and 340b are on a first axis. In this instance, the slow-axis scanning mirrors 340a and 340b are vertically rotated to reflect the pulsed wavelength-modulated coherent light beams 335a and 335b with a vertical scan pattern. The vertical scan pattern covers a desired field of view. The first and second slow-axis scanning mirrors 340a and 340b are configured to provide a positional offset so the reflected pulsed wavelength-modulated coherent light beams 345a and 345b impinge upon different facets of a fast-axis scanning mirror 350. The fast-axis scanning mirror 350 is a polygonal cylinder with each facet 351a, 351b, and 351c of the fast-axis scanning mirror 350 having equally sized rectangular mirrored shapes 351a, 351b, and 351c formed on the outside surface of the polygonal cylinder of the fast-axis scanning mirror 350

The fast-axis scanning mirror 350 is rotated by motor 352 on shaft 353 horizontally to create a horizontal scan pattern. The horizontal scan pattern covers a horizontal field of view. The combination of vertical and horizontal scan patterns produces a first 2-dimensional scan pattern 355a and a second 2-dimensional scan pattern 355b from the reflected pulsed wavelength-modulated coherent light beams 135a and 135b, respectively. The positional offset of the first and second slow-axis scanning mirrors 340a and 340b determines the separation of the first and second 2-dimensional scan patterns 355a and 355b. The two 2-dimensional scan patterns 355a and 355b form a combined scan pattern with twice larger scan area compared to each 2-dimensional scan pattern 355a and 355b and thus increase the effective scan area.

In FIG. 3B, the collimators 325a and 325b are configured with a positional offset small enough that the pulsed wavelength-modulated coherent light beams 345a and 345b are directed to a different portion on a single slow-axis scanning mirror 340. The slow-axis scanning mirror 340 is vertically rotated to reflect the pulsed wavelength-modulated coherent light beams 345a and 345b with a vertical scan pattern. reflected pulsed wavelength-modulated coherent light beams 345a and 345b impinge upon different portions of a fast-axis scanning mirror 350. The fast-axis scanning mirror 350 is identical to the fast-axis scanning mirror 350 of FIG. 3A.

The fast-axis scanning mirror 350 is rotated horizontally on shaft 353 by motor 352 to create a horizontal scan pattern. The combination of vertical scan pattern and horizontal scan pattern produces a first 2-dimensional scan pattern 355a and a second 2-dimensional scan pattern 355b from the reflected pulsed wavelength-modulated coherent light beams 135a and 135b, respectively. The two 2-dimensional scan patterns 355a and 355b completely overlap to form a combined scan pattern with twice larger scan pixel density compared to each individual 2-dimensional scan pattern and thus increase the effective scan pixel density or effective scan speed. In some embodiments, the 2-dimensions scan patterns 355a and 355b will partially overlap such that a portion of combined scan patterns 355a and 355b have an increased pixel density, while increasing the scan pixel area.

Figure 4:
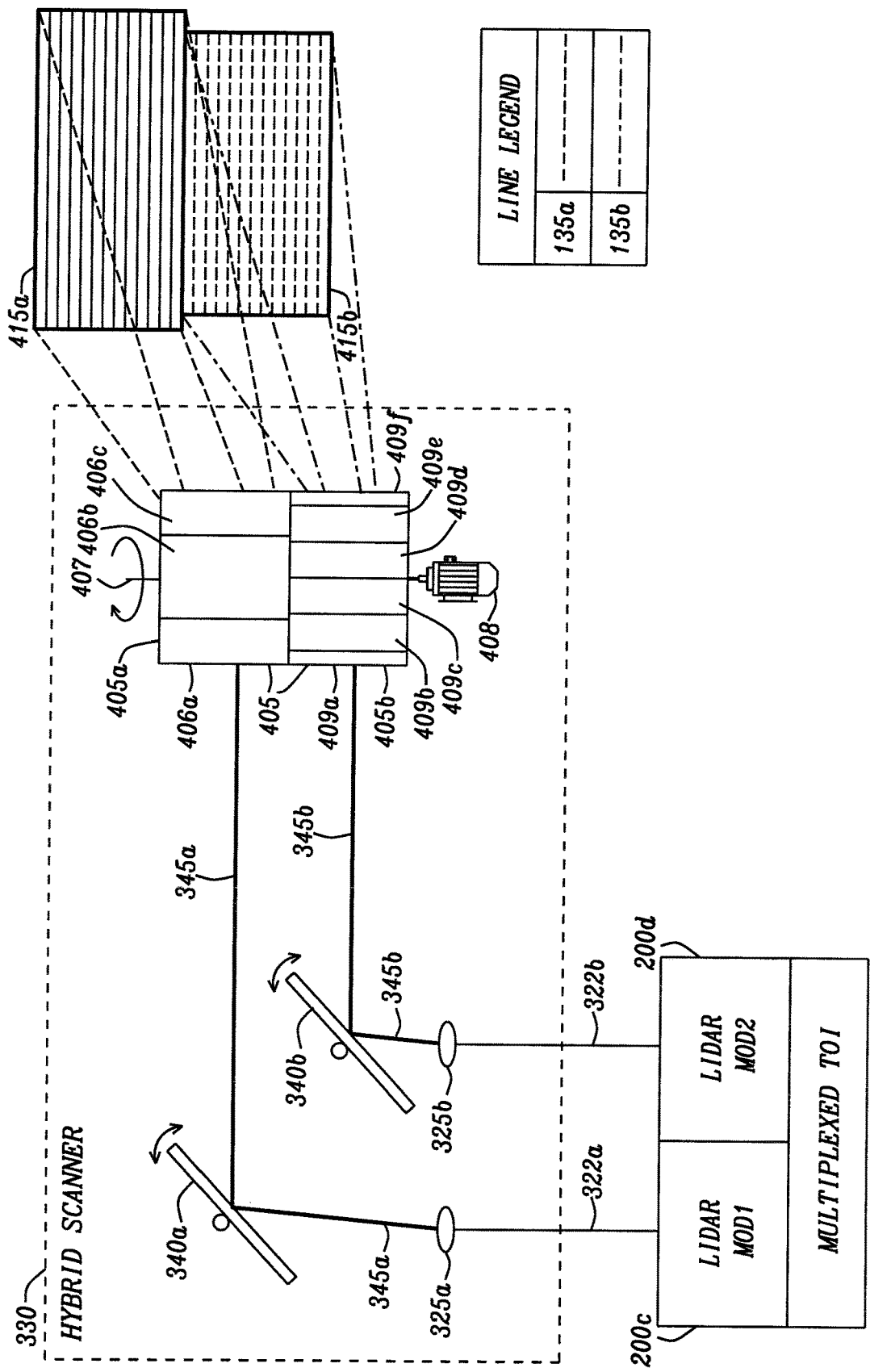
FIG. 4 is a schematic drawing of a scanner configured to scan two illumination light beams from two LiDAR modules of FIG. 1B, embodying the principles of the present disclosure, to form two scan patterns with different scan areas and scan pixel density.

FIG. 4 is a schematic drawing of the scanner 330 configured for receiving the sampling arms 122a and 122b of the LiDAR modules 200c and 200d of FIG. 3A. As illustrated in FIG. 3A, the scanner 330 is configured for receiving the sampling arms 322a and 322b of the LiDAR modules 200c and 200d. The pulsed wavelength-modulated coherent light from the sampling arms 322a and 322b of the LiDAR modules 200c and 200d is applied to the collimators 325a and 325b. The pulsed wavelength-modulated coherent light beams 345a and 345b from collimators 325a and 325b are directed respectively to slow-axis scanning mirrors 340a and 340b. The slow-axis scanning mirrors 340a and 340b are vertically rotated to reflect the pulsed wavelength-modulated coherent light beams 345a and 345b with a vertical scan pattern. The vertical scan pattern covers a desired field of view. The first and second slow-axis scanning mirrors 340a and 340b are configured with a positional offset so the reflected pulsed wavelength-modulated coherent light beams 345a and 345b impinge upon different portions of a fast-axis scanning mirror 405. The fast-axis scanning mirror 405 is a rotational polygonal mirror that consists of two different sets of facet configurations, including a low facet portion (a fewer number of facets) 405a and a high facet portion (a greater number of facets) 405b. The low facet portion 405a has each facet 406a, 406b, and 406c and the high facet portion 405b has each facet 409a, 409b, 409c 409d, 409e, and 409f formed of equally sized rectangular mirrored shapes 409a, 409b, 409c 409d, 409e, and 409f formed on the outside surface of the polygonal cylinder of the fast-axis scanning mirror 405

The first reflected pulsed wavelength-modulated coherent light impinges upon the low facet portion 405a of the polygon mirror 405, and the second reflected pulsed wavelength-modulated coherent light 405b impinges upon the high facet portion 405b of the polygon mirror 405. Alternately, but not shown, the polygon mirror 405 could be inverted with the second back-reflected pulsed wavelength-modulated coherent light beams 345b impinging upon the low facet portion 405b and the first reflected pulsed wavelength-modulated coherent light beams 345a impinging upon the high facet portion 405b. The first instance results in the pulsed wavelength-modulated coherent light beam 135a forming a first 2-dimensional scan pattern 415a that has a broader scan area and lower scan pixel density, and the pulsed wavelength-modulated coherent light beams 135b forming a second 2-dimensional scan pattern 415b has a narrower scan area and higher scan pixel density. This implementation enables the Multiplex LiDAR system to accommodate different scanning requirements and parameters simultaneously, including, but not limited to, fields of view (FOVs) and pixel density for near/far field image formation.

As noted above, the motor 408 rotates the shaft 407 to rotate the fast-axis scanning mirror 405.

Figure 5A:
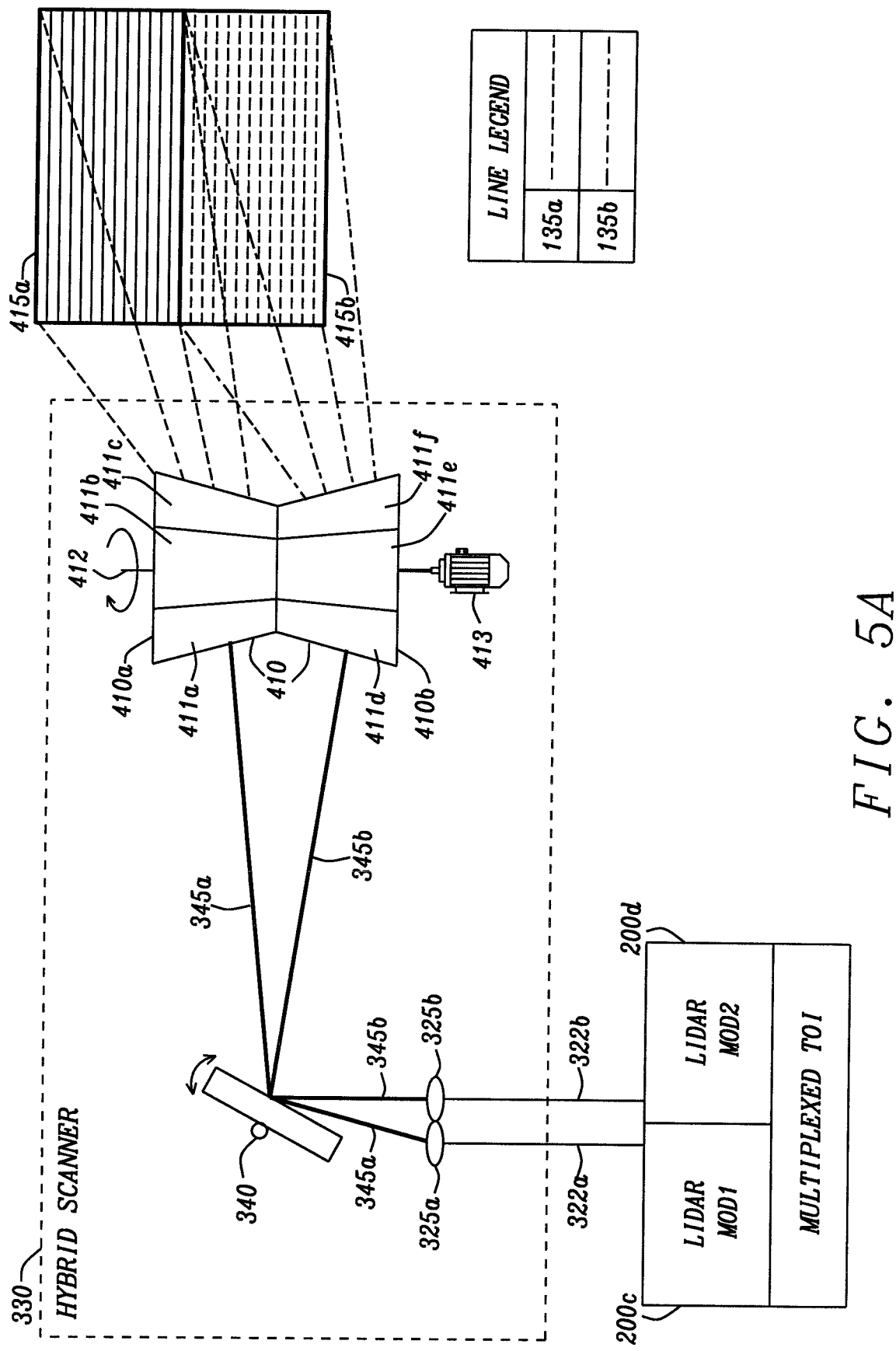
FIG. 5A is a schematic drawing of an angled-polygonal-mirror-based scanner configured to scan two illumination light beams from two LiDAR modules of FIG. 1B, embodying the principles of the present disclosure, to form a larger scan pattern.
Figure 5B:
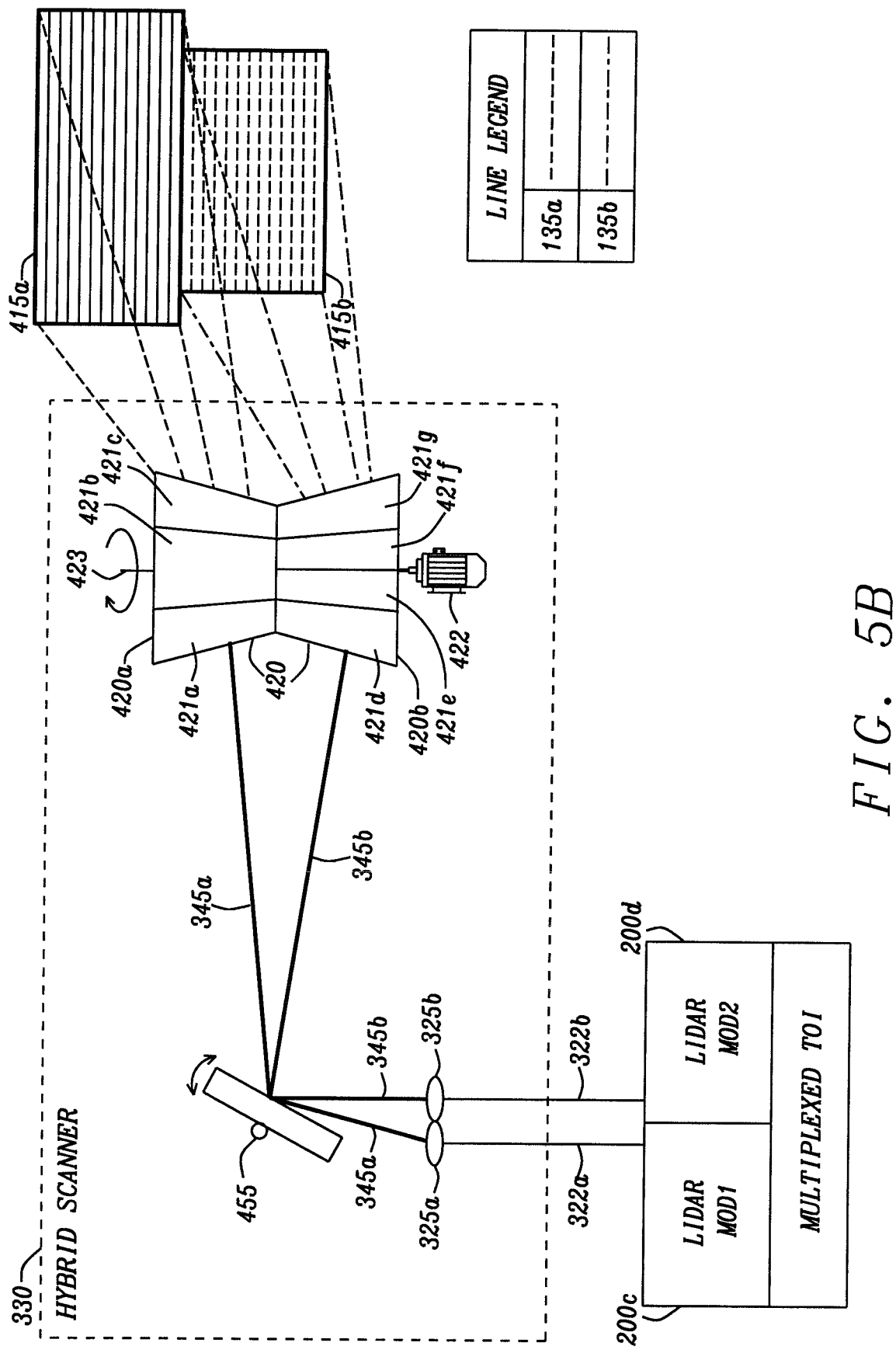
FIG. 5B is a schematic drawing of an angled-polygonal-mirror based scanner configured to scan two illumination light beams from two LiDAR modules of FIG. 1B, embodying the principles of the present disclosure, to form two scan patterns with different scan areas and scan pixel density.

FIGS. 5A and 5B are schematic drawings of the scanner 130 configured for receiving the sampling arms. As illustrated in FIG. 5A, scanner 330 is configured for receiving the sampling arms 322a and 322b of the interferometers 110a and 110b of the LiDAR modules 200c and 220d. The collimators 325a and 325b are configured with a positional offset and an angular offset small enough that the pulsed wavelength-modulated coherent light beams 325a and 325b are directed to different portions on a single slow-axis scanning mirror 340. The slow-axis scanning mirror 340 is vertically rotated to reflect the pulsed wavelength-modulated coherent light beams 325a and 325b with a vertical scan pattern. The reflected pulsed wavelength-modulated coherent light beams 345a and 345b impinge upon different portions of a fast-axis scanning mirror 410, The fast-axis scanning mirror 410 has two polygonal cylindrical sections 410a and 410b. The first polygonal cylindrical section 410a has a plurality of isosceles trapezoidal facet mirrors 411a, 4116b, and 411c. The isosceles trapezoidal facet mirrors 411a, 4116b, and 411c are formed on the facet surfaces of the first polygonal cylindrical section 410a, with the upper edges being longer than the lower edges.

The second polygonal cylindrical section 410b has a plurality of isosceles trapezoidal facet mirrors 411d, 4116e, and 411f. The isosceles trapezoidal facet mirrors 411d, 4116e, and 411f are formed on the facet surfaces of the first polygonal cylindrical section 410b, with the lower edges being longer than the upper edges.

The fast-axis scanning mirror 410 with the isosceles trapezoidal facet mirrors 411a, 4116b, 411c 411d, 4116e, and 411f compensate for the angle offset of the reflected pulsed wavelength-modulated coherent light beams 345a and 345b. The fast-axis scanning mirror 410 is rotated horizontally by motor 412 through the shaft 413 to create a horizontal scan pattern. The combination of vertical scan pattern and horizontal scan pattern produces a first 2-dimensional scan pattern 415a and a second 2-dimensional scan pattern 415b to completely overlap the two 2-dimensionals scan patterns 415a and 415b to from the reflected pulsed wavelength-modulated coherent light beams 135a and 135b, respectively. The two 2-dimensional scan patterns 415a and 415b form a combined scan pattern with a scan pixel density that is two times larger than each individual 2-dimensional scan pattern and thus increases the effective scan pixel density or effective scan speed. In some embodiments, the 2-dimensions scan patterns 415a and 415b will partially overlap such that a portion of combined scan patterns 415a and 415b have an increased pixel density, while increasing the scan pixel area.

In FIG. 5B, the basic structure of the hybrid scanner 330 is identical to that of the hybrid scanner 330 of FIG. 5A. The fast-axis scanning mirror 420 is a rotational polygonal mirror. The rotational polygonal mirror 420 consists of two different polygonal cylindrical sections 420a and 420b, including a low facet portion 420a with the fewest facets and a second portion 420b with the most facets. The first reflected pulsed wavelength-modulated coherent light beam 135a impinges upon the second portion 420a of the polygon mirror 420. The second reflected pulsed wavelength-modulated coherent light beams 135b impinge upon the first portion 420b of the rotational polygonal mirror 420 and results in a first 2-dimensional scan pattern 415a with broader scan area and lower scan pixel density, and a second 2-dimensional scan pattern 415b with narrower scan area and higher scan pixel density. This implementation enables the Multiplex LiDAR system 300 of FIG. 2 to accommodate different scanning requirements and parameters and simultaneously including, but are not limited to, fields of view (FOVs) and pixel density for near/far field image formation.

Figure 6A:
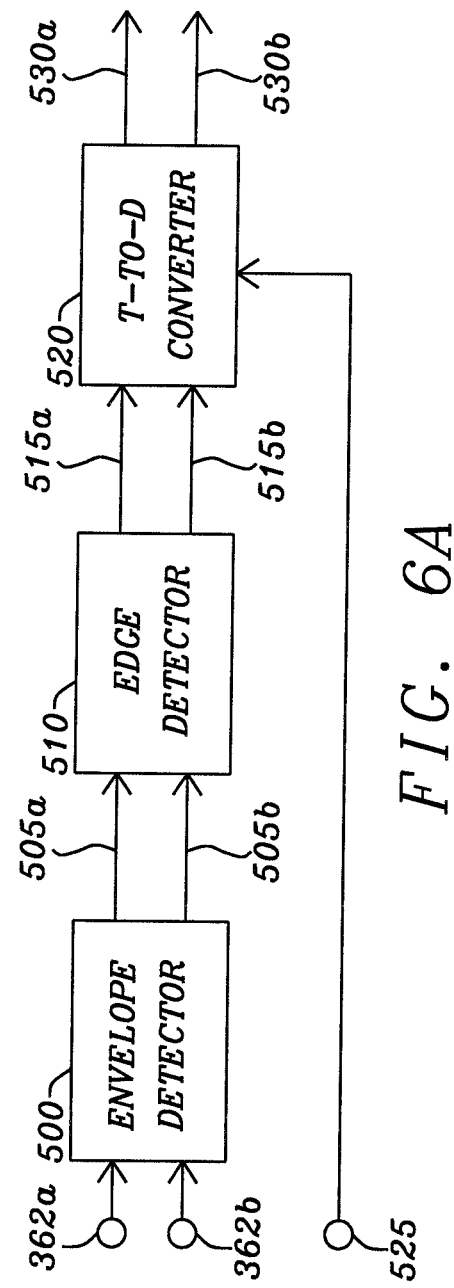
FIG. 6A is a block diagram of an electrical TOI measurement circuit illustrating a program structure of a signal processor configured for performing a multiplexed TOI LiDAR-based distance measurement embodying the principles of the present disclosure.

FIG. 6A is a block diagram of an electrical TOI measurement circuit included within the signal processor. The interference electrical signals 362a and 362b of FIG. 2 generated from the LiDAR modules 200a and 200b are received by a multi-channel envelope detector 500 and converted to an envelope 505a and 505b of the interference electrical signals 362a and 362b. The multi-channel envelope detector 500 is implemented as a radio frequency (RF) power detector, a root mean square (RMS) detector, or a frequency demodulator. The radiofrequency (RF) power detector, the root mean square (RMS) detector, or the frequency demodulator are known in the art and are commercially available devices. The radiofrequency (RF) power detector, the root mean square (RMS) detector, or the frequency demodulator remove the high-frequency components in the interference electrical signal 362a and 362b and thus extract the envelope of the interference electrical signal 362a and 362b.

The envelope signals 505a and 505b are transferred to a multi-channel edge detector 510. The multi-channel edge detector 510 determines a pulse event and places the pulse event at the edge detector's output 510. The pulse event indicates the leading or falling edge of the envelope signals 505a and 505b. The multi-channel edge detector 510 is realized as an edge-to-glitch converter, an XOR gate and delay circuit, a differentiator circuit, or the like. The edge-to-glitch converter, the XOR gate, and delay circuit, the differentiator circuit are similarly known in the art and are commercially available.

The edge detector's 510 outputs 515a and 515b are connected to inputs of a multi-channel time-to-digital converter 520. The multi-channel time-to-digital converter 520 generates a time difference signal transferred to the outputs 530a and 530b of the multi-channel time-to-digital converter 520. The time difference signal at the output 530a and 530b of the multi-channel time-to-digital converter 520 indicates the time between the rising edge or falling edge of the pulse events 505a and 505b and the pulse event 525. The pulse event 525 corresponds to the rising edge or the falling edge of the light source modulating signal 377 as transferred from the modulation/scanning controller 375. The pulse event 525 is the trigger for starting the multi-channel time-to-digital converter 520 in counting the time intervals. The pulse output 515a and 515b of the multi-channel edge detector 510 provide the pulse event for terminating the counting of the time intervals by the multi-channel time-to-digital converter 520. A series of time difference signals at the outputs 530a and 530b of the multi-channel time-to-digital converter 520 are translated into the depth measurements to form images displayed by the computer 170.

Figure 6B:
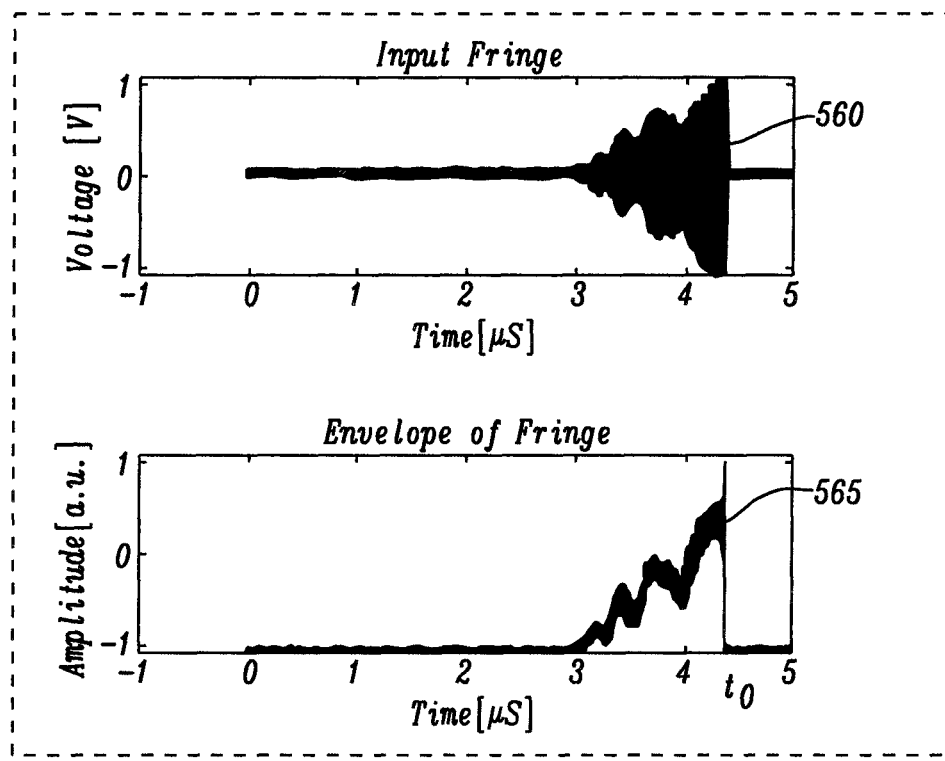
FIG. 6B is a plot of the sample arm's back-reflected pulse fringe at zero (0) meter location and envelope embodying the principles of the present disclosure.
Figure 6C:
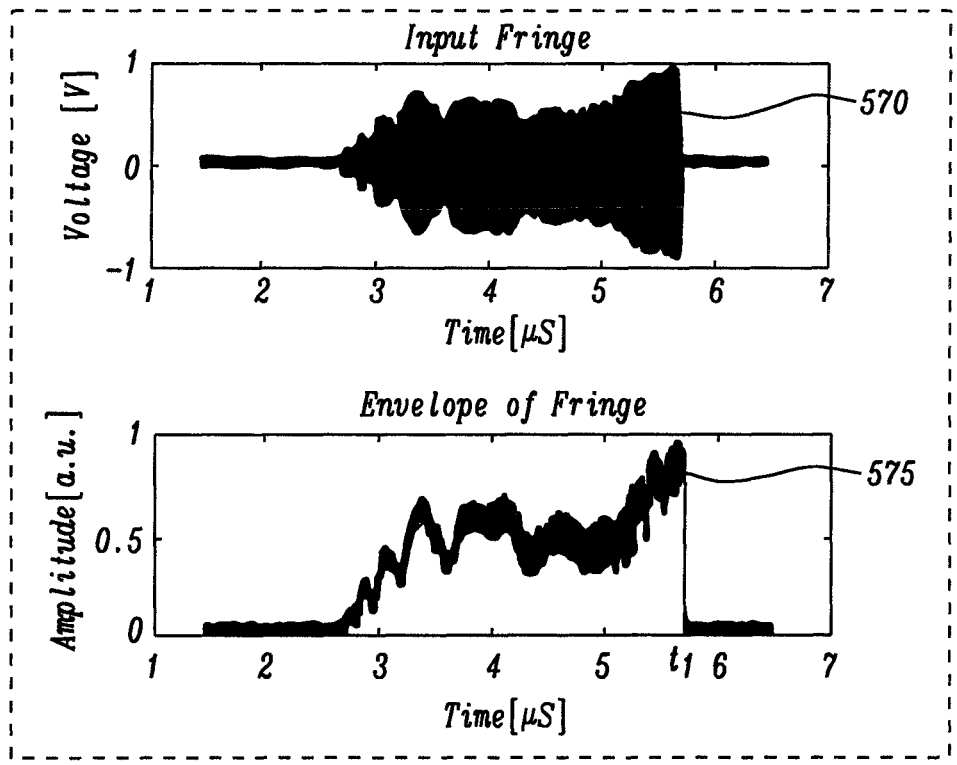
FIG. 6C is a plot of the sample arm's back-reflected pulse fringe at a 180-meter location and envelope embodying the principles of the present disclosure.

FIG. 6B is a plot of the reference arm's pulse input fringe 560 and envelope 565 embodying the principles of the present disclosure. The plots of FIG. 6B are an example of the electrical interference signal of the prototype TOI system 300 of FIG. 2 detecting an object at a zero (0) meter location. FIG. 6C is a plot of another sample arm's back-reflected pulse fringe 570 and envelope 575 embodying the principles of the present disclosure. The plots of FIG. 6C are an example electrical interference signal of the prototype TOI system 300 detecting an object at a 180 m location. The multi-channel edge detector 510 of FIG. 6A determines the time of the falling edge $t_0$ of the envelope of the reference arm 565 and the time of the falling edge $t_1$ of the envelope of the sample arm 575. The multi-channel time-to-digital converter 520 counts the time interval between the reference arm's falling edge time $t_0$, and the sample arm's falling edge time $t_1$. The distance from the object being measured is determined by the equation:

$$Distance = c*(t_0 - t_1)$$

Where:
c is the speed of light.
$t_0$ is the reference arm's falling edge time.
$t_1$ is the sample arm's falling edge time.

A series of time difference signals at the outputs 530a and 530b of the multi-channel time-to-digital converter 520 can be translated into the depth information and form images displayed by the computer 370.

Figure 7:
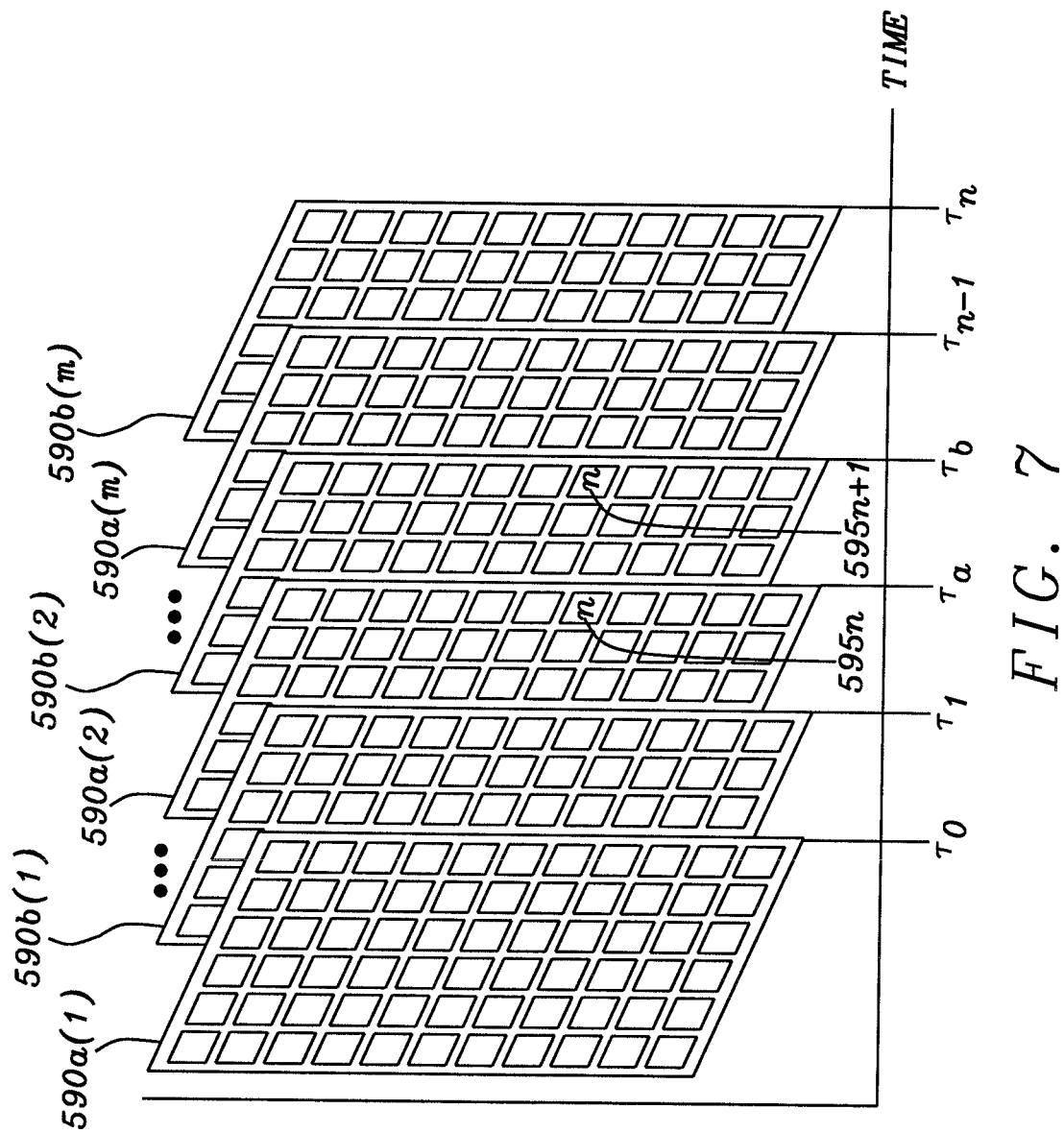
FIG. 7 illustrates the frame-based velocity measurement method of the TOI LIDAR system embodying the principles of the present disclosure.

FIG. 7 illustrates the frame-based velocity measurement method using the Multiplexed LiDAR system embodying the principles of the present disclosure. The Multiplexed LiDAR System can be configured that a small time delay is encoded in the second TOI modules, so the frames 590a(1), 590a(2), 590a(m), and 590b(1), 590b(2), ..., 590b(m), are captured in an interleaved manner by the TOI modules 200a and 200b of FIG. 2, respectively, and represents a first and a second interference electrical signals 362a and 362b of FIG. 2

The data 595a and 595b are transferred to the signal processor 365 and processed as described in FIG. 6A to thus determine the rising edges or falling edges of the data. Therefore, the determination of the data's rising edges or falling edges provides the time difference between the data 595a and 595b. The distance between the data 615a and 615b is then determined as the time difference $(t_b - t_a)$ between the data 595a and 595b. The time difference $(t_b - t_a)$ between the data 595a and 595b is multiplied by the frame rate of the optical interference signal's sampling applied to optical paths of the LiDAR modules 200a and 200b to determine the velocity of the object being measured.

Figure 8A:
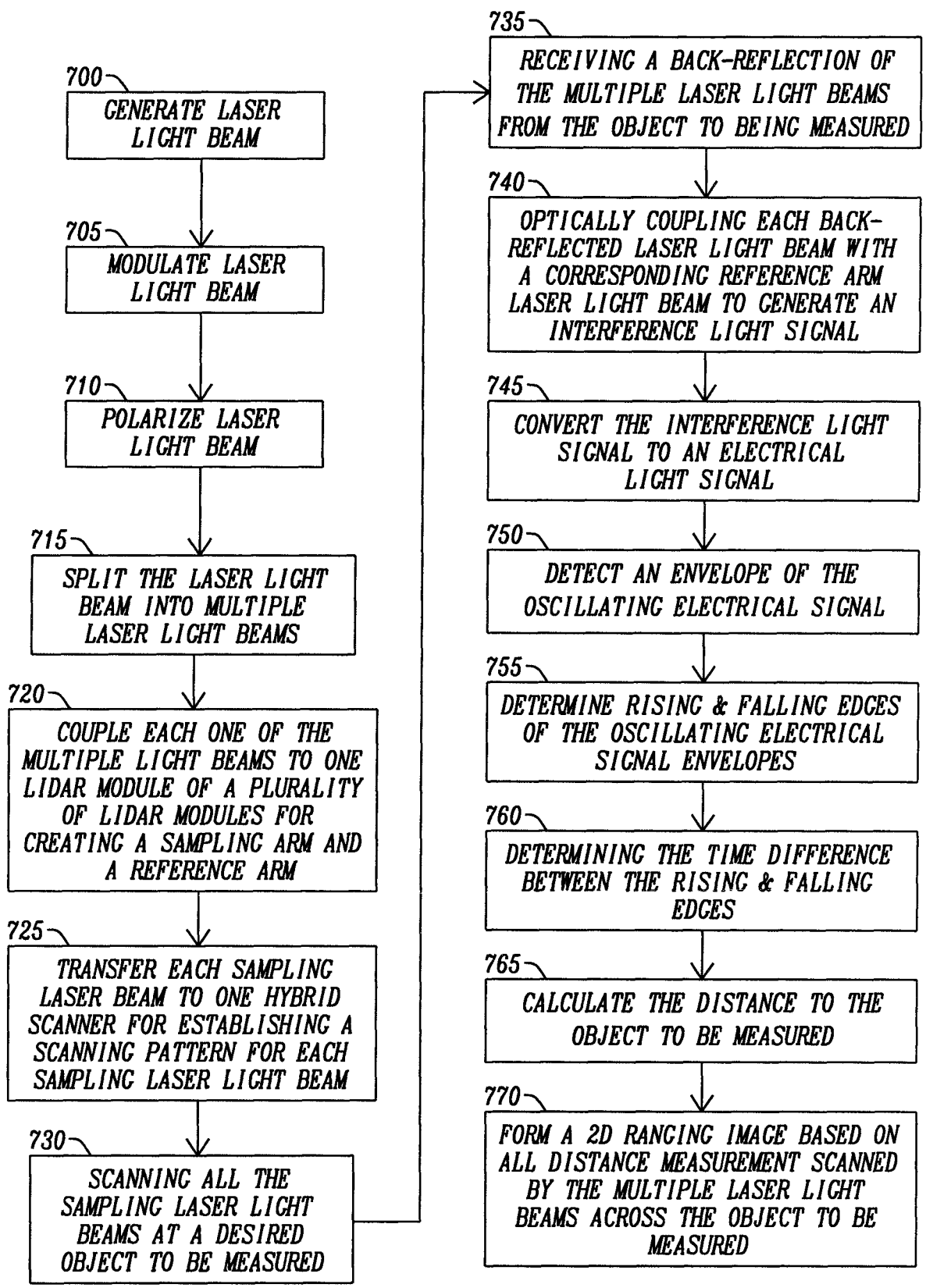
FIG. 8A is a flowchart of a method for determining an object's distance employing multiplexed distance measurement embodying the principles of the present disclosure.

FIG. 8A is a flowchart of a method for determining an object's distance employing TOI based Multiplexed LiDAR system embodying the principles of the present disclosure. A laser light beam is generated (Box 700). The laser light beam is modulated (Box 705) with a wavelength-modulated or frequency-modulated signal to adjust the laser light beam's wavelength or frequency. The laser light beam is then polarized (Box 710) to adjust the laser light's polarization states to maximize the amplitude of the optical interference signal or electrical interference signal.

The laser light beam is optically split (Box 715) into multiple light beams, and each of the split laser light beams is coupled (Box 720) to one LiDAR module for creating a sampling arm and an reference arm. Each of the sampling arms is connected (Box 725) to one hybrid scanner to establish a scanning pattern for each sampling laser light beam. Each sampling laser beam scans the object to be measured (730). A fractional part of each laser coherent light beam is back-reflected from the object to be measured and received (Box 735) by each hybrid scanner associated with the back-reflected pulsed wavelength-modulated coherent laser beam. The back-reflected pulsed wavelength-modulated coherent laser beam is coupled (Box 740) to the optical circulator of the interferometer to an optical coupler to be combined with the reference pulsed wavelength-modulated coherent laser beam to form an optical interference signal. The optical interference signal is converted (Box 745) to an oscillating electrical interference signal.

The electrical interference signals undergo an envelope detection process to identify (Box 750) the envelopes of the electrical interference signal. The times of the rising or the falling edges of the envelope rising or falling edges of the envelope of the digitized electrical interference signal are determined (Box 755). The time difference between the rising or falling edges of the envelopes of the electrical interference signals and a modulation/scan synchronization signal is determined (Box 760), and the distance to the object to be measured is calculated (Box 765). As the multiple laser light beams are scanned at the object, a two-dimensional ranging image is formed based on all distance measured and the angular location of the scanner (Box 760).

Figure 8B:
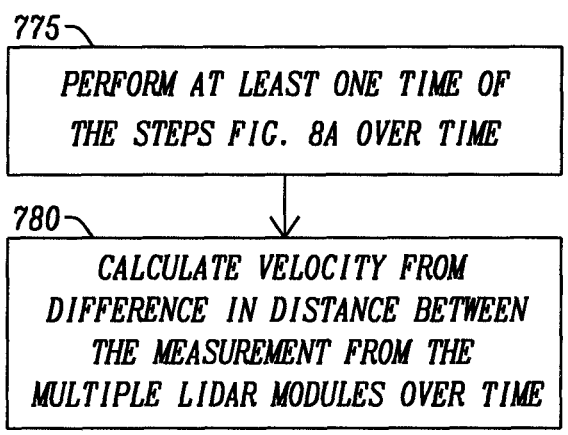
FIG. 8B is a flowchart of a method for determining an object's velocity employing multiplexed distance measurement embodying the principles of the present disclosure.

FIG. 8B is a flowchart of a method for determining an object's velocity employing Time of Interference (TOI) based Multiplexed LiDAR system embodying the principles of the present disclosure. The method for determining an object's velocity utilizing TOI based Multiplexed LiDAR system begins with performing (Box 775) the steps of the method of Fig. 8A multiple times. The object's velocity is determined (Box 780) as the difference in distance measured by the multiple TOI modules over time.

Figure 9A:
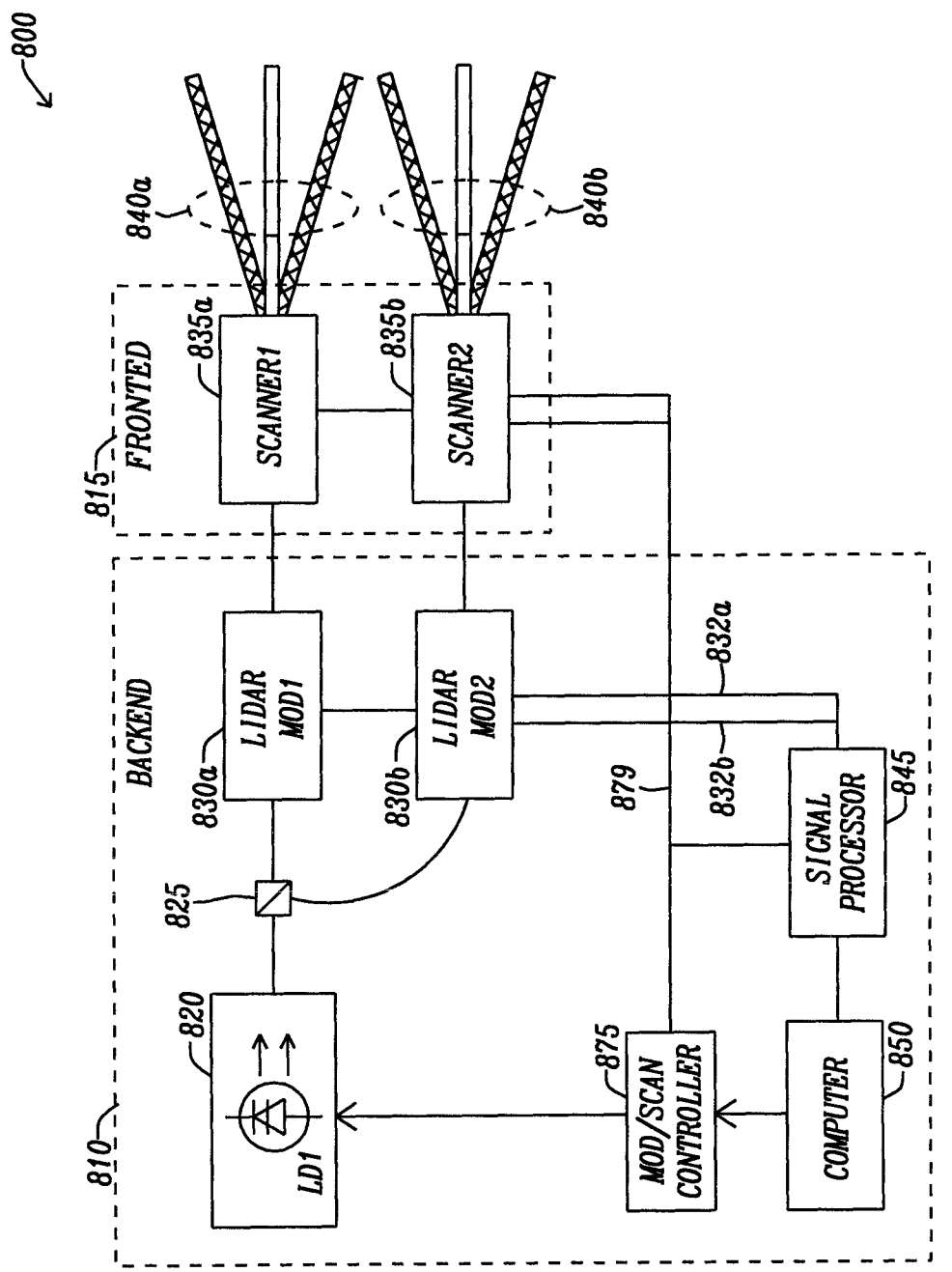
FIG. 9A is a schematic drawing of a Multiplexed LiDAR System with multiple frontend scanners embodying the principles of the present disclosure.

In various embodiments, each LiDAR module in the Multiplexed LiDAR system is equipped with multiple scanners so that the distance of multiple objects at different locations is measured simultaneously by a single LiDAR system. FIG. 9A is a schematic drawing of a Multiplexed LiDAR system 500 based on TOI LiDAR embodying the principles of the present disclosure. Instead of using a single scanner like the system described in FIG. 2, the sample arms of the first and the second TOI modules 200a and 200b are connected separately to a first scanner 805a and a second scanner 805b to physically transfer the first sample pulsed wavelength-modulated coherent light 135a and the second sample pulsed wavelength-modulated coherent light 135b to scan different objects.

Figure 9B:
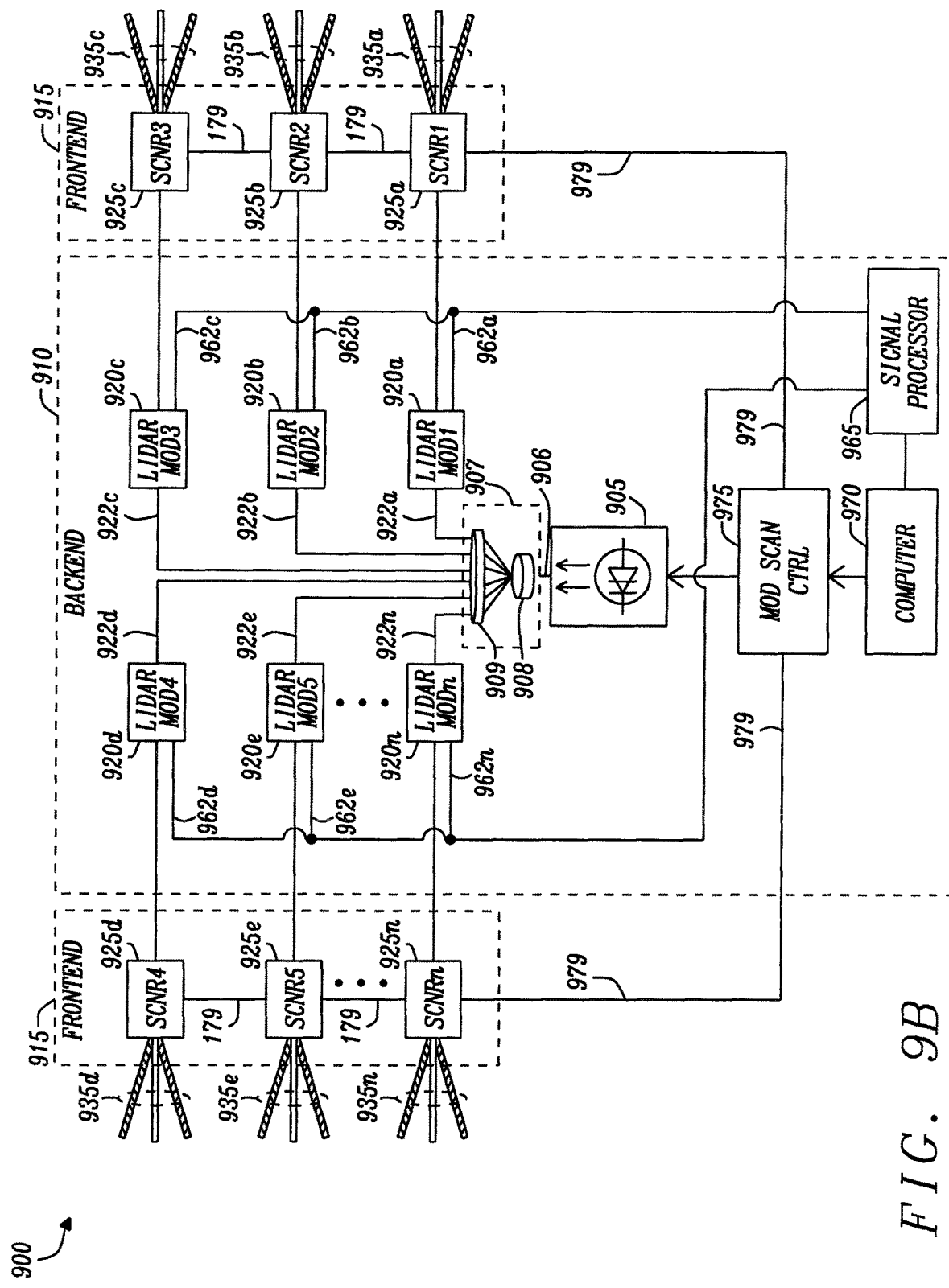
FIG. 9B is a schematic drawing of an implementation of the Multiplexed LiDAR System with multiple frontend scanners embodying the principles of the present disclosure.

FIG. 9B is a schematic drawing of the Multiplexed LiDAR system 900 for muti-directional distance measurement embodying the principles of the present disclosure. A single backend system 910 comprises one pulsed wavelength-modulated light source 905 that transfers the pulsed wavelength-modulated light beam 906 to a multiple beam splitter 907. An exemplary multiple beam spitter 907 includes a diffractive beam splitter 908 that provides the number of separate beams required by the LIDAR system 900. The multiple wavelength-modulated light beams are directed to a focusing lens 909 for re-collimating each light beam. Each light beam is transferred to a TOI LIGHT module 920a, 920b, 920c, 920d, 920e, ..., 920n. In various embodiments, a multi-channel optical switch can be used in place of the multiple beam splitter 907 for applications that requires high detection sensitivity and narrower field of view or slower detection speed is acceptable.

Each of the LiDAR modules 920a, 920b, 920c, 920d, 920e, ..., 920n are connected to a scanner 925a, 925b, 925c, 925d, 925e, ..., 925n within the front end of the Multiplexed LiDAR system 800. Each scanner 925a, 925b, 925c, 925d, 925e, ..., 925n is configured as a 1-dimensional or 2-dimensional scanner as described in FIGS. 3A, 3A, 4, 5A, and 5B. The scanners 925a, 925b, 925c, 925d, 925e, ..., 925n transfer the sample pulsed wavelength-modulated coherent light beams 935a, 935b, 935c, 935d, 935e, ..., 935n to scan one or more objects in different directions within the circumference of the surrounding environment.

The back-reflected wavelength-modulated coherent light beams 935a, 935b, 935c, 935d, 935e, ..., 935n from the scanned object(s) are received by the scanners 925a, 925b, 925c, 925d, 925e, ..., 925n and transferred to the LiDAR modules 920a, 920b, 920c, 920d, 920e, ..., 920n to form an image based on the TOI measurement. The 1-dimensional scanning pattern may be linear or non-linear in time and maybe unidirectional or bidirectional. In some implementations of the Multiplexed LIDAR system 900, the 2-dimensional scanning pattern may be linear or non-linear in time. It may be in the form of a raster scan, spiral scan, or other patterns to collect the measurement information.

The back-reflected wavelength-modulated coherent light beams 935a, 935b, 935c, 935d, 935e, ..., 935n, received by the TOI LiDAR modules 920a, 920b, 920c, 920d, 920e, ..., 920n is then transferred to the signal processor 965 The signal processor 965 has a plurality of the balanced detectors 160 of FIG. 1B that receive the The back-reflected wavelength-modulated coherent light beams 935a, 935b, 935c, 935d, 935e, ..., 935n. The balance detectors 160 of FIG. 1B convert the light beams 935a, 935b, 935c, 935d, 935e, ..., 935n to electrical signals that are processed by the computer 970 to generate the image based on the age based on the TOI measurement.

The scanners 925a, 925b, 925c, 925d, 925e, ..., 925n may be realized mechanically as galvanometer mirrors, polygon mirrors, micro-electro-mechanical systems (MEMS), piezo actuators, optically including acousto-optic (AO) deflector, or a solid-state scanner. There may be other methods in keeping with the principles of the present disclosure of providing the required scanning motion to collect the measurement information.

While this disclosure has been particularly shown and described with reference to the preferred embodiments thereof, it will be understood by those skilled in the art that various changes in form and details may be made without departing from the spirit and scope of the disclosure. Particularly, the Multiplexed Systems 100 of FIGS. 2 and 800 of FIG. 9A may be implemented with Time of Flight (ToF), Amplitude Modulated Continuous Wave (AMCW), Frequency Modulated Continuous Wave (FMCW), or any combination of LiDAR devices known in the art.

What is claimed is:

1. A hybrid scanner within a multiplexed light detection and ranging (LiDAR) system for executing a scan pattern of a plurality of sample pulsed wavelength-modulated coherent light beams, comprising:
   a plurality of optical collimators configured such that one sampled pulsed wavelength-modulated coherent light beam is transferred to each collimator of the plurality of optical collimators;
   wherein each of the plurality of collimators comprise:
      one or more graded-index fiber rods, where in each fiber rod is formed with a separate lens in contact with the graded-index fiber rod to provide the low numerical aperture as required of the graded-index fiber rod and the engineered graded-index lens for long-distance illumination and the higher numerical aperture required for receiving back-reflected pulsed wavelength-modulated coherent light from the object;
   at least one slow-axis rotating planar mirror to receive and reflect at one least collimated sample pulsed wavelength-modulated coherent light beam and configured to rotate along a first axis to form a first-dimensional scan pattern of the sample pulsed wavelength-modulated coherent light beams;
   a fast-axis rotating multi-faceted scanning mirror structured for reflecting the multiple pulsed wavelength-modulated coherent light beams configured to rotate on a second axis to form a second-dimensional scan pattern of the multiple pulsed wavelength-modulated coherent light beams;

wherein the multiple pulsed wavelength-modulated coherent light beams are transmitted to an object to determine its geometric dimensions with a combination of the first-dimensional scan and the second-dimensional scan pattern.

2. The hybrid scanner of claim 1 wherein the multiple pulsed wavelength-modulated coherent light beams are back reflected to the hybrid scanner and reflected by the fast-axis rotating faceted scanning mirror to the at least one slow axis rotating planar mirror and through the at least one collimator to an interferometer within a LiDAR module for determining dimensions of the scanned object.

3. The hybrid scanner of claim 1 wherein the at least one slow-axis rotating planar mirror is two slow-axis rotating planar mirrors where a first pulsed wavelength-modulated coherent light beam impinges upon a first slow-axis rotating planar mirror and a second pulsed wavelength-modulated coherent light beam impinges upon a second slow-axis rotating planar mirror.

4. The hybrid scanner of claim 3 wherein the first pulsed wavelength-modulated coherent light beam reflected from the first slow-axis rotating planar mirror and the second pulsed wavelength-modulated coherent light beam reflected from the second slow-axis rotating planar mirror impinges upon the fast-axis rotating multi-faceted scanning mirror.

5. The hybrid scanner of claim 4 wherein first and second rotating slow-axis scanning mirrors are configured to provide a positional offset between each of the first and second rotating slow-axis scanning mirrors, so the reflected pulsed wavelength-modulated coherent light beams impinge upon selected facets of fast-axis rotating multi-faceted scanning mirror.

6. The hybrid scanner of claim 5 wherein the pulsed wavelength-modulated coherent light beams reflect from the selected facets of the rotating multi-faceted fast-axis scanning mirror are transmitted to an object to determine its geometric dimensions with a combination of the first-dimensional scan pattern and the second-dimensional scan pattern.

7. The hybrid scanner of claim 6 wherein the fast-axis rotating multi-faceted scanning mirror comprises:
a multiple faceted polygonal cylinder having a central shaft;
a motor connected to the central shaft for rotating the polygonal cylinder;
a plurality of mirrors wherein one mirror is formed on each facet of the polygonal mirror.

8. The hybrid scanner of claim 6 wherein a portion of each of the pulsed wavelength-modulated coherent light beams that impacts upon the object is back-reflected to the selected facets of the rotating multi-faceted fast-axis scanning mirror, and the back-reflected pulsed wavelength-modulated coherent light beams are transferred to the first and second rotating slow-axis scanning mirrors, and then further transferred to an interferometer to generate a light interference signal.

9. A multiplexed light detection and ranging (LiDAR) system for measuring a distance from the multiplexed LiDAR system to features on an object, comprising:
a coherent light source ;
a modulating controller in communication with the coherent light source and configured for generating and controlling a control signal that is transferred to the coherent light source for modulating the coherent light source to generate a pulsed wavelength-modulated coherent light beam, for creating a scan pattern for measuring a surface of the object;
at least two LiDAR modules connected with the coherent light source for receiving the pulsed wavelength-modulated coherent light beam and comprising:
an interferometer, comprising: an optical splitter for dividing the pulsed wavelength-modulated coherent light beam into at least two pulsed wavelength-modulated coherent light beams;
a hybrid scanner in communication with the at least two LiDAR modules to receive the pulsed wavelength-modulated coherent light beams and configured to scan a surface of the object with the pulsed wavelength-modulated coherent light beams to trace the scan pattern on the surface of the object for measuring the distance from the multiplexed (LiDAR) system to the features of the object, wherein a fraction of each of the pulsed wavelength-modulated coherent light beams is back reflected to the hybrid scanner and to each interferometer of the at least two LiDAR modules wherein each of the at least two LiDAR modules further comprises a balanced detector to convert the back reflected pulsed wavelength-modulated coherent light beams electrical;
wherein, the hybrid scanner comprises a plurality of collimators, and each of the plurality of collimators comprise: one or more graded-index fiber rods, where in each fiber rod is formed with a separate lens in contact with the graded-index fiber rod to provide the low numerical aperture as required of the graded-index fiber rod and the engineered graded-index lens for long-distance illumination and the higher numerical aperture required for receiving back-reflected pulsed wavelength-modulated coherent light from the object;
a signal processor in communication with a photodetector array within the balanced detector of the LiDAR modules to receive the electrical signals and convert the electrical signals to digitized electrical signals; and
a computer system configured programmed to calculate the time delay determined by the digitized electrical signal from the signal processor and generates a displayed imaging range based on the distance from the target.

10. The multiplexed LiDAR system of claim 9 wherein the at least two LiDAR modules are connected with the coherent light source via an optical splitter or an optical switch for receiving the pulsed wavelength-modulated coherent light beam.

11. The multiplexed LiDAR system of claim 9 wherein the hybrid scanner further comprises:
at least one slow-axis rotating planar mirror to receive and reflect at least collimated sample pulsed wavelength-modulated coherent light beam and configured to rotate along a first axis to form a first-dimensional scan pattern of the sample pulsed wavelength-modulated coherent light beams;
a fast-axis rotating multi-faceted scanning mirror structured for reflecting the multiple pulsed wavelength-modulated coherent light beams configured to rotate on a second axis to form a second-dimensional scan pattern of the multiple pulsed wavelength-modulated coherent light beams;
wherein the multiple pulsed wavelength-modulated coherent light beams are transmitted to an object to determine its geometric dimensions with a combination of the first-dimensional scan and the second-dimensional scan pattern.

12. The multiplexed LiDAR system of claim 11 wherein the multiple pulsed wavelength-modulated coherent light beams are back reflected to the hybrid scanner and reflected by the fast-axis rotating faceted scanning mirror to the at least one slow axis rotating planar mirror, and through the at least one collimator to the interferometer within a LiDAR module for determining dimensions of the scanned object.

13. The multiplexed LiDAR system of claim 11 wherein the at least one slow-axis rotating planar mirror is two slow-axis rotating planar mirrors where a first pulsed wavelength-modulated coherent light beam impinges upon a first slow-axis rotating planar mirror and a second pulsed wavelength-modulated coherent light beam impinges upon a second slow-axis rotating planar mirror.

14. The multiplexed LiDAR system of claim 13 wherein the first pulsed wavelength-modulated coherent light beam reflected from the first slow-axis rotating planar mirror and the second pulsed wavelength-modulated coherent light beam reflected from the second slow-axis rotating planar mirror impinges upon the fast-axis rotating multi-faceted scanning mirror.

15. The multiplexed LiDAR system of claim 14 wherein first and second rotating slow-axis scanning mirrors are configured to provide a positional offset between each of the first and second rotating slow-axis scanning mirrors, so the reflected pulsed wavelength-modulated coherent light beams impinge upon selected facets of fast-axis rotating multi-faceted scanning mirror.

16. The multiplexed LiDAR system of claim 15 wherein the pulsed wavelength-modulated coherent light beams reflected from the selected facets of the rotating multi-faceted fast-axis scanning mirror are transmitted to an object to determine its geometric dimensions with a combination of the first-dimensional scan pattern and the second-dimensional scan pattern.

17. The multiplexed LiDAR system of claim 16 wherein the fast-axis rotating multi-faceted scanning mirror comprises:
  a multiple faceted polygonal cylinder having a central shaft;
  a motor connected to the central shaft for rotating the polygonal cylinder;
  a plurality of mirrors wherein one mirror is formed on each facet of the polygonal mirror.

18. The multiplexed LiDAR system of claim 17 wherein a portion of the pulsed wavelength-modulated coherent light beams that impact upon the object are back-reflected to the selected facets of the rotating multi-faceted fast-axis scanning mirror, and the back-reflected pulsed wavelength-modulated coherent light beams are transferred to the first and second rotating slow-axis scanning mirrors, and then further transferred to an interferometer to generate a light interference signal.

19. The multiplexed LiDAR system of claim 9 wherein the modulating controller is configured to modulate the coherent light source by controlling the coherent light source's driving current, adjusting the temperature of the narrow bandwidth light source, or adjusting the phase of the light emitted from the light source.

20. The multiplexed LiDAR system of claim 9 wherein the LiDAR module comprises:
  a first coupler configured to receive the pulsed wavelength-modulated coherent light from the coherent light source and configured to divide the pulsed wavelength-modulated coherent light into a first portion of the pulsed wavelength-modulated coherent light and a second portion of the pulsed wavelength-modulated coherent light;
  a circulator connected to receive the first portion of the pulsed wavelength-modulated coherent light and configured such that the first portion of the pulsed wavelength-modulated coherent light enters a first port of the circulator and exits from the subsequent port to direct the first portion of the pulsed wavelength-modulated coherent light to the scanner;
  a sample arm connected to the first coupler to receive the first portion of the pulsed wavelength-modulated coherent light and transfer the first portion of the pulsed wavelength-modulated coherent light to the scanner;
  a reference arm connected to the first coupler to receive the second portion of the pulsed wavelength-modulated coherent light; and
  a second coupler configured to receive the back-reflected portion of the pulsed wavelength modulated coherent light, configured to receive the second portion of the pulsed wavelength modulated coherent light from the reference arm, and configured to couple the back-reflected portion of the pulsed wavelength modulated coherent light and the second portion of the pulsed wavelength modulated coherent light to form an optical interference signal; and
    a photodetector array configured to receive the optical interference signal and convert the optical interference signal to an electrical interference signal.

21. The multiplexed LiDAR system of claim 19 wherein the LiDAR module further comprises:
  a polarization controller configured to receive the pulsed wavelength-modulated coherent light emission, transfer the pulsed wavelength-modulated coherent light emission to the first coupler, and configured to adjust the polarization states of the coherent light emission from the light source and maximize the amplitude of the optical interference signal or electrical interference signal.

22. The multiplexed LiDAR system of claim 9 wherein the photodetector array is configured as a polarization-diversity balanced amplified detector and comprises at least one power monitor to measure the input power level to the photodetector array, wherein the power monitor output provides a modulated power level with a time delay associated with the object's distance.

23. The multiplexed LiDAR system of claim 9 wherein the signal processor is configured to determine envelopes of at least two digitized electrical signals.

24. The multiplexed LiDAR system of claim 22 wherein the signal processor is configured to measure delays of the at least two digitized electrical signals at falling edges of the envelopes of the digitized electrical signal.

25. The multiplexed LiDAR system of claim 9 further comprises a scan controller configured to create the scan pattern that generates a scan synchronization signal and configured to apply the scan synchronization signal to the scanner to generate scan patterns that achieve the collection of the measurement information describing the object.

26. The multiplexed LiDAR system of claim 9 wherein the multiplexed LiDAR system is implemented as fiberoptics, bulk optics, integrated photonic circuitry, or any combination of optical photonic devices.

27. A method for determining an object's distance comprises the steps of:
generating a coherent light beam;
modulating the coherent light beam with a pulsed wavelength-modulating signal;
polarizing the pulsed wavelength-modulated light beam by adjusting the polarization states of the pulsed wavelength-modulated light beam and maximizing the amplitude of optical interference signals;
optically splitting the pulsed wavelength-modulated light beam into at least two pulsed wavelength-modulated light beams;
coupling each of the at least two pulsed wavelength-modulated light beams to one of at least two LiDAR Modules for creating a sampling pulsed wavelength-modulated light beam and a reference pulsed wavelength-modulated light beam;
transferring the at least two pulsed wavelength-modulated light beams to a hybrid scanner module for establishing a scan pattern for each of the pulsed wavelength-modulated light beams;
scanning the at least two pulsed wavelength-modulated light beams at an object whose distance from a source of the wavelength-modulated coherent light beam is to be measured;
receiving the back-reflected portion of the at least two pulsed wavelength-modulated light beams from the object to be measured;
coupling each back-reflected portion of each of the at least two pulsed wavelength-modulated light beams to a corresponding LiDAR module of the at least two pulsed wavelength-modulated light beams to form an electrical signal representing each of the at least two pulsed wavelength-modulated light beams;
forming a hybrid scanner by the steps of
forming a plurality of optical collimators by configuring the optical collimators such that one sampled pulsed wavelength-modulated coherent light beam is transferred to each collimator of the plurality of optical collimators;
wherein forming each optical collimator of the plurality of optical collimators to contain one or more graded-index fiber rods, by forming each fiber rod with a separate lens in contact with the graded-index fiber rod for providing a low numerical aperture as required of the graded-index fiber rod and and forming the engineered graded-index lens for long-distance illumination and the higher numerical aperture required for receiving back-reflected pulsed wavelength-modulated coherent light from the objective;
digitizing the electrical signals;
detecting an envelope of each of the digitized electrical signals for determining the envelope of each of the digitized electrical signals;
determining the times of rising or falling edges of the envelope of the digitized electrical signal;
determining the time difference between the rising or falling edges of the envelope of the digitized interference signal;
calculating a distance to the object to be measured is calculated; and
forming a two-dimensional ranging image based on all distance measurements scanned by the at least two pulsed wavelength-modulated light beams across the object to be measured.

28. The method of claim 27 further comprises the steps of:
determining the object's velocity by calculating the distances from the at least two LiDAR modules separately; and
calculating the object's velocity as the change in distance over time.

29. The method of claim 27 further comprises the step of implementing the method with fiberoptics, bulk optics, integrated photonic circuitry, or any combination of optical photonic devices.

* * * * *